United States Patent [19]

Kulpa

[11] Patent Number: 4,911,268

[45] Date of Patent: Mar. 27, 1990

[54] TORQUE OR FORCE LINEARIZING DEVICE

[75] Inventor: Walter J. Kulpa, Trumbull, Conn.

[73] Assignee: Pitney Bowes Inc., Stamford, Conn.

[21] Appl. No.: 291,482

[22] Filed: Dec. 28, 1988

[51] Int. Cl.[4] .......................... F03G 1/00; F16H 7/12; F16H 55/17

[52] U.S. Cl. ........................................ 185/37; 74/98; 74/437; 74/517; 74/518; 474/117; 474/135

[58] Field of Search ............... 74/98, 437, 516, 517, 74/518; 474/117, 126, 135; 185/37, 39

[56] References Cited

U.S. PATENT DOCUMENTS

| | | | |
|---|---|---|---|
| 1,972,851 | 9/1934 | McCarthy | 242/55.2 |
| 1,982,299 | 11/1934 | Hapgood | 474/135 |
| 2,107,603 | 2/1938 | Ellenburg | 242/55.4 |
| 2,177,727 | 10/1939 | Krakaur . | |
| 2,253,270 | 8/1941 | Golber | 74/437 |
| 2,700,285 | 1/1955 | Bellini | 74/437 X |
| 2,970,536 | 2/1961 | Bach | 101/227 |
| 3,098,399 | 7/1963 | Berthiaume | 74/437 X |
| 3,401,630 | 9/1968 | Goodrich, Jr. et al. | 101/228 |
| 3,487,716 | 1/1970 | Hirst, Jr. | 74/516 |
| 3,556,001 | 1/1971 | Kinney et al. | 101/92 |
| 3,660,203 | 5/1972 | Beck et al. | 156/384 |
| 3,712,527 | 1/1973 | Luperti et al. | 226/136 |
| 3,784,073 | 1/1974 | Faggetter | 226/47 |
| 3,791,293 | 2/1974 | Rastorguyeff et al. | 101/234 |
| 3,867,861 | 2/1975 | Hamisch, Sr. | 83/571 |
| 3,878,777 | 4/1975 | Clary | 101/93.28 |
| 4,007,681 | 2/1977 | Swaniger | 101/288 |
| 4,018,153 | 4/1977 | Freeman | 101/93 |
| 4,082,595 | 4/1978 | Slater | 156/351 |
| 4,519,868 | 5/1985 | Hoffmann | 156/353 |
| 4,671,153 | 6/1987 | Peyre | 83/203 |
| 4,696,683 | 10/1972 | Jensen | 74/98 X |

FOREIGN PATENT DOCUMENTS 131552  8/1919  United Kingdom ................ 474/135

*Primary Examiner*—Allan D. Herrmann
*Attorney, Agent, or Firm*—Charles G. Parks, Jr.; David E. Pitchenik; Melvin J. Scolnick

[57] ABSTRACT

The invention disclosed herein provides a device which a non-linear force/distance relationship of spring or other device and linearizes it in a range of interest. In accordance with the invention, the device comprises a first gear section and a second gear section. The first and second gear sections are pivotally supported in a meshing relationship. The first gear section includes gear teeth extending about an arc of a first circle having a first center, and the second gear section includes gear teeth extending about an arc of a second circle having a second center. The mating pair of sections comprise a non-circular gearing pair. For limited ranges of motion the non-circular gears can be approximated by eccentrically mounted circular gears. The two gear sections thus pivot eccentrically with respect to each other such that a variable torque or force must be applied to one gear section to obtain a constant torque or force from the other gear section, and vice versa. In a disclosed embodiment, the spring tension/winding angle of a torsion-type spring is linearized. The spring has a first end fixed against movement and a second end coupled to one of the gear sections. In a range of interest, a constant torque may be obtained from the second gear section.

2 Claims, 20 Drawing Sheets

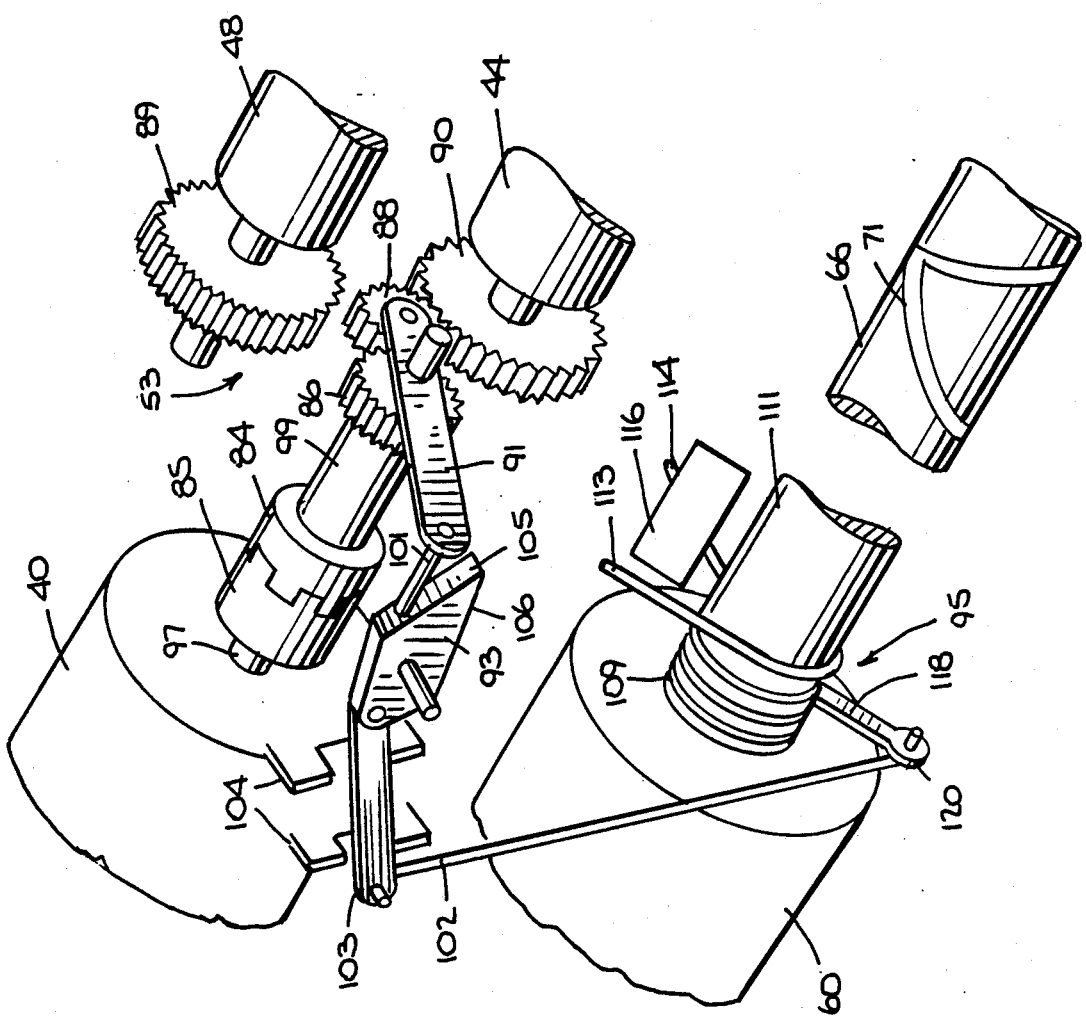

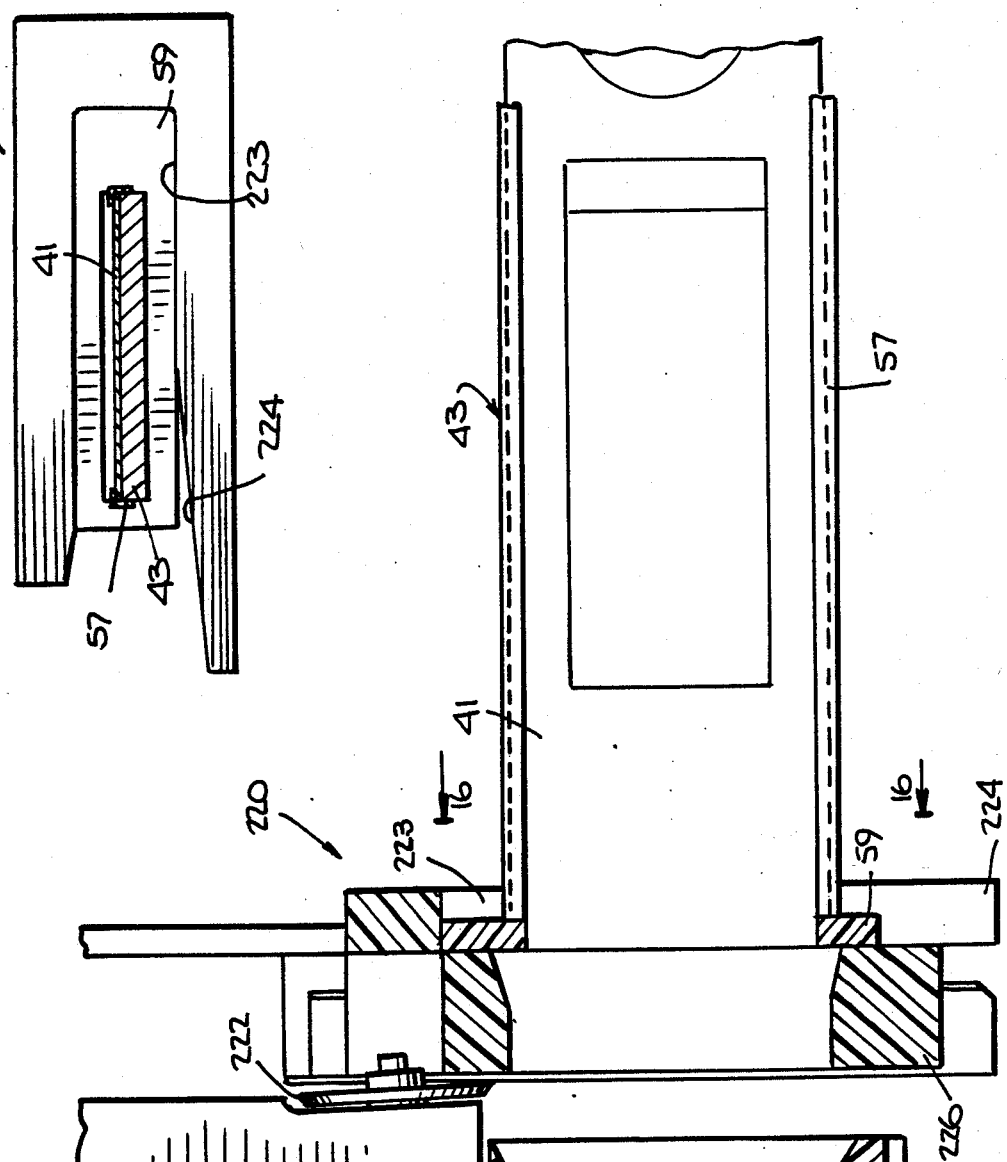
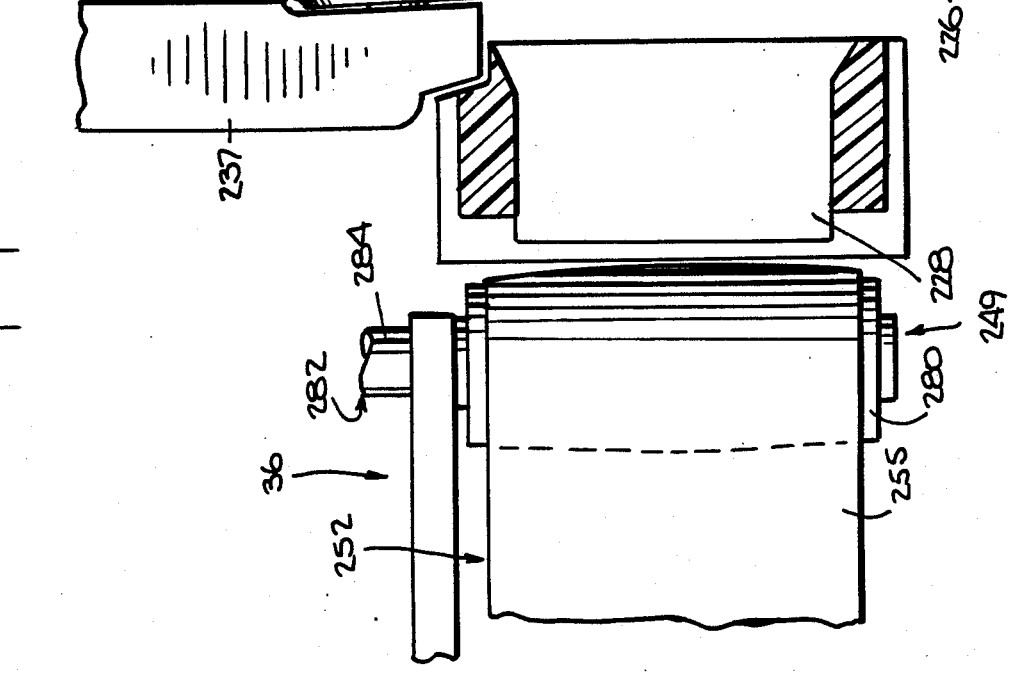

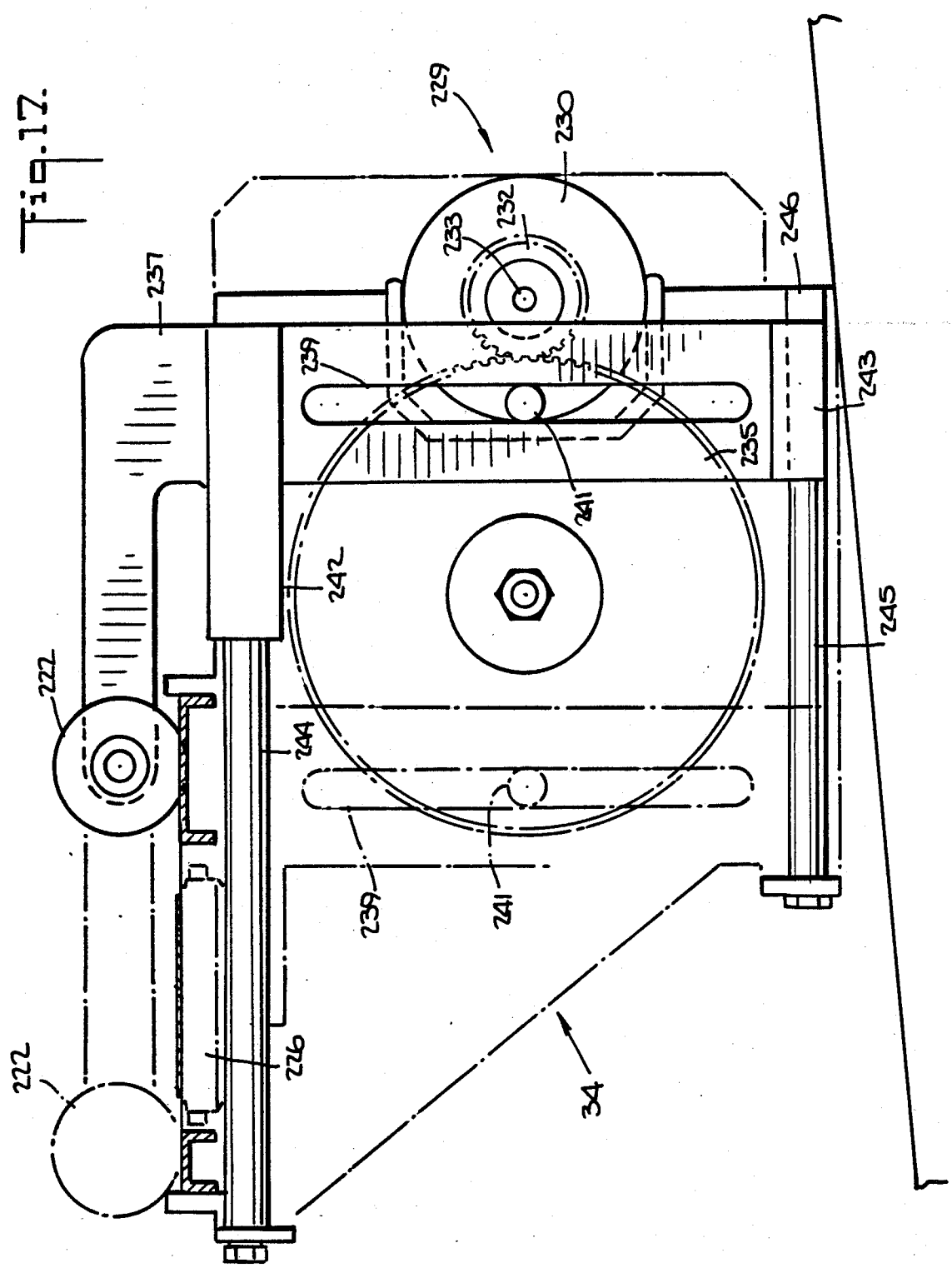

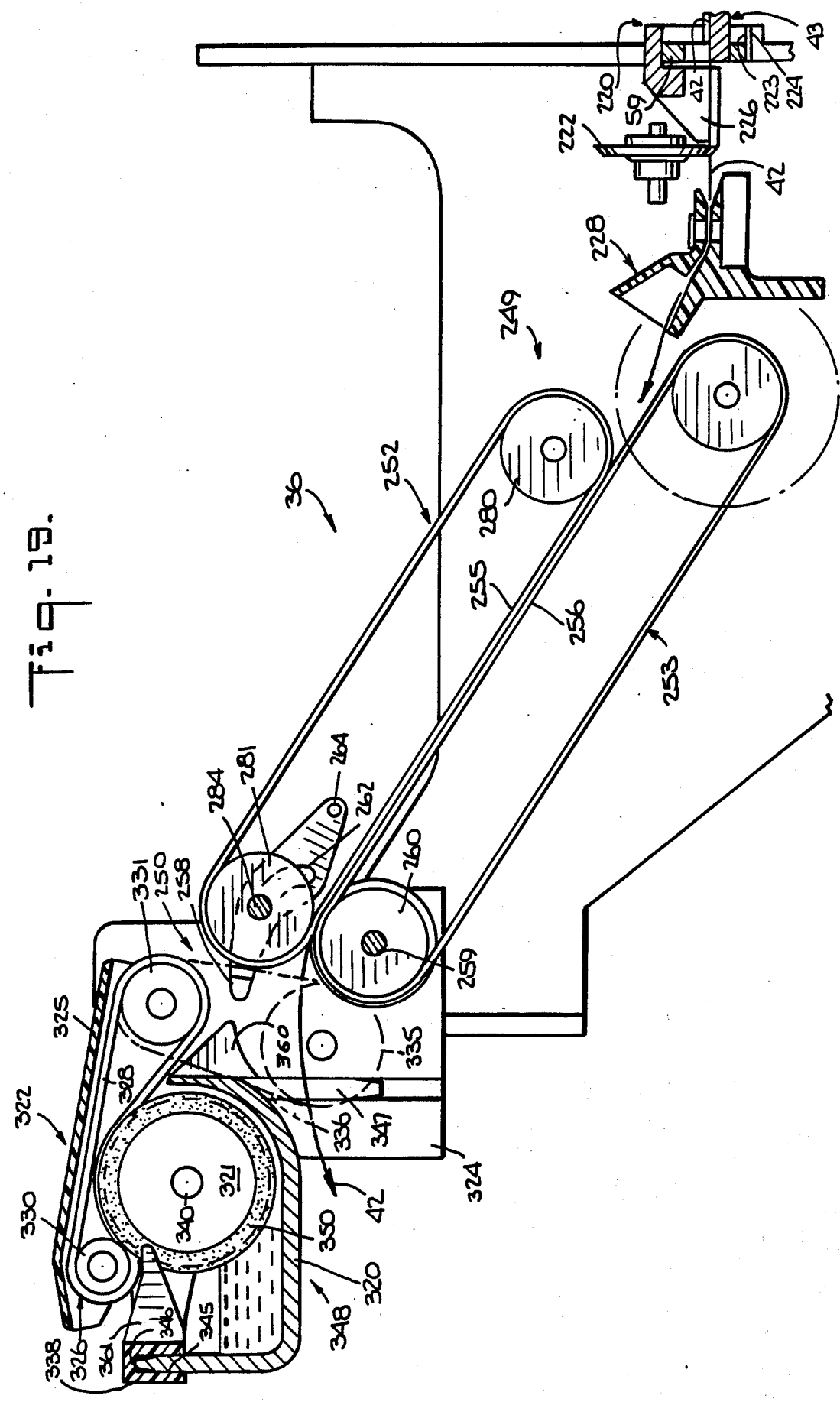

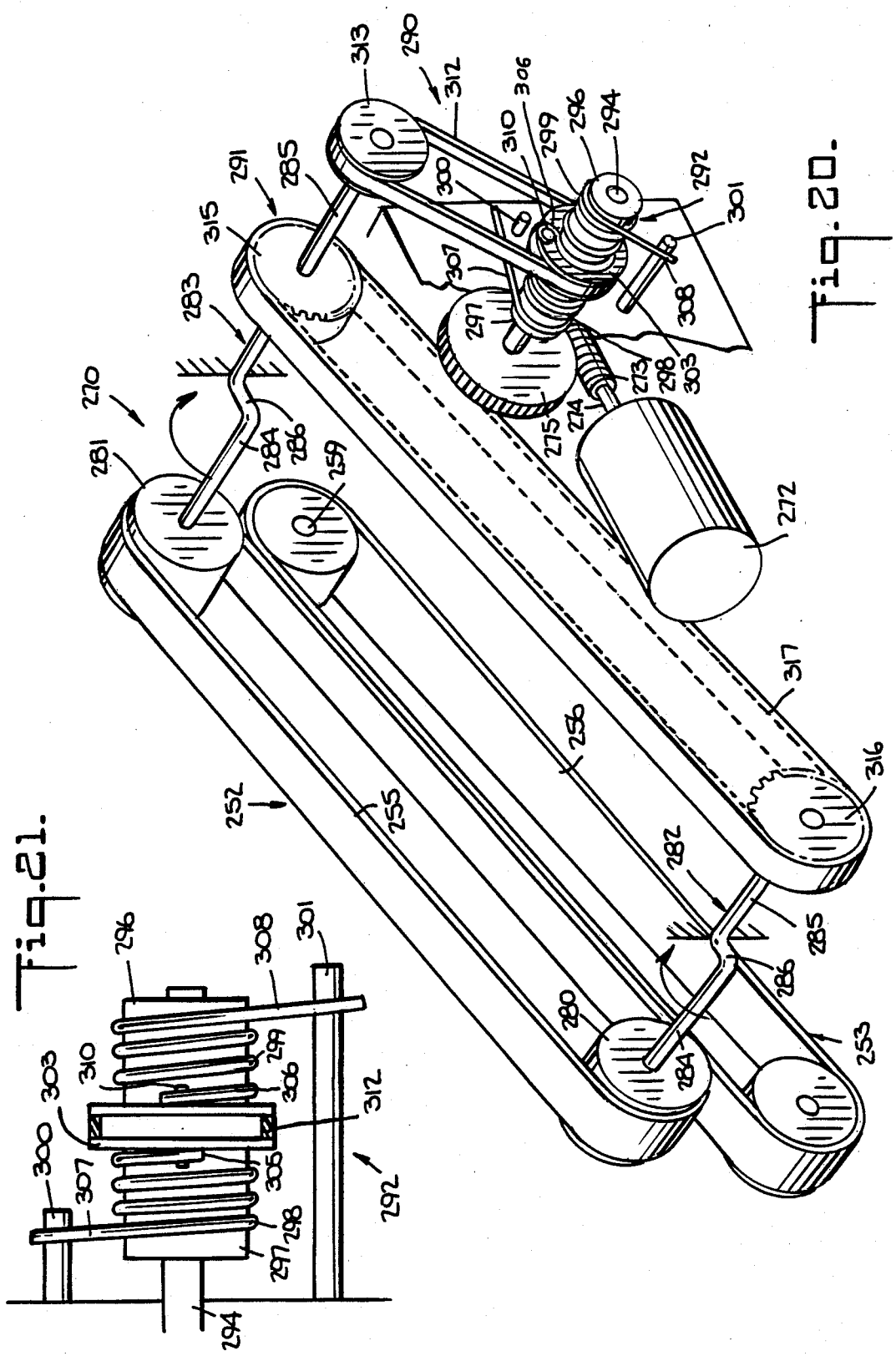

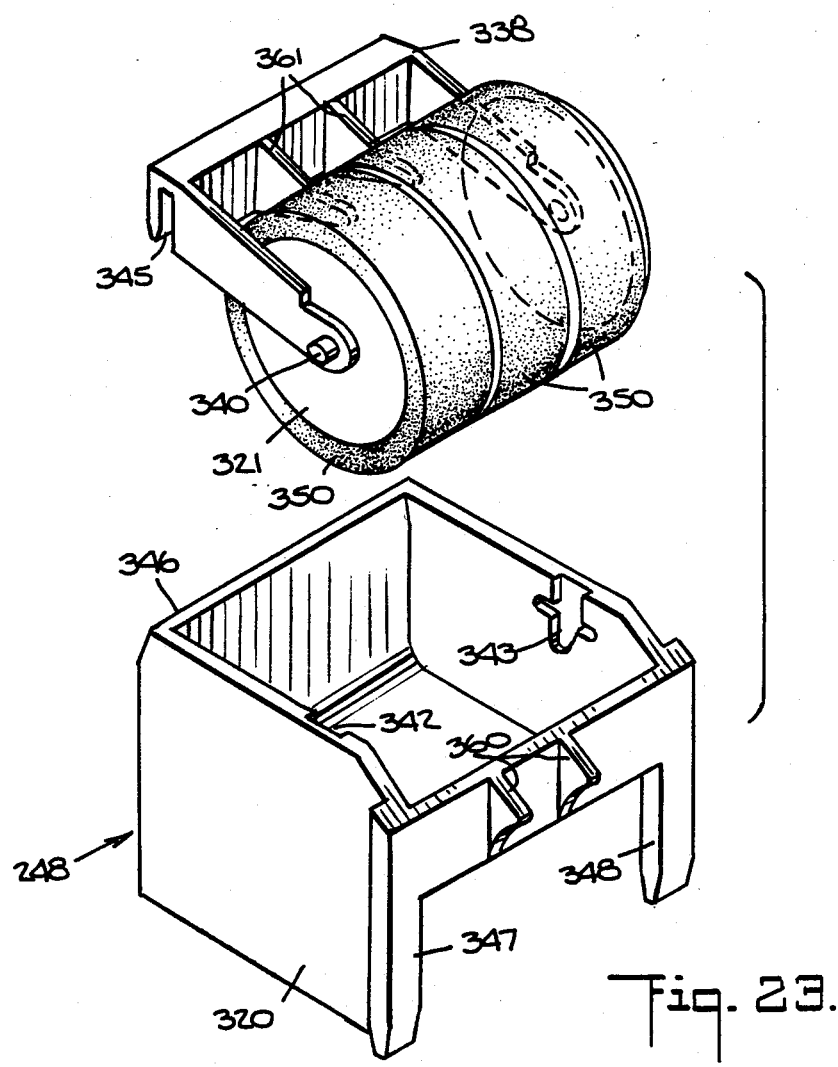
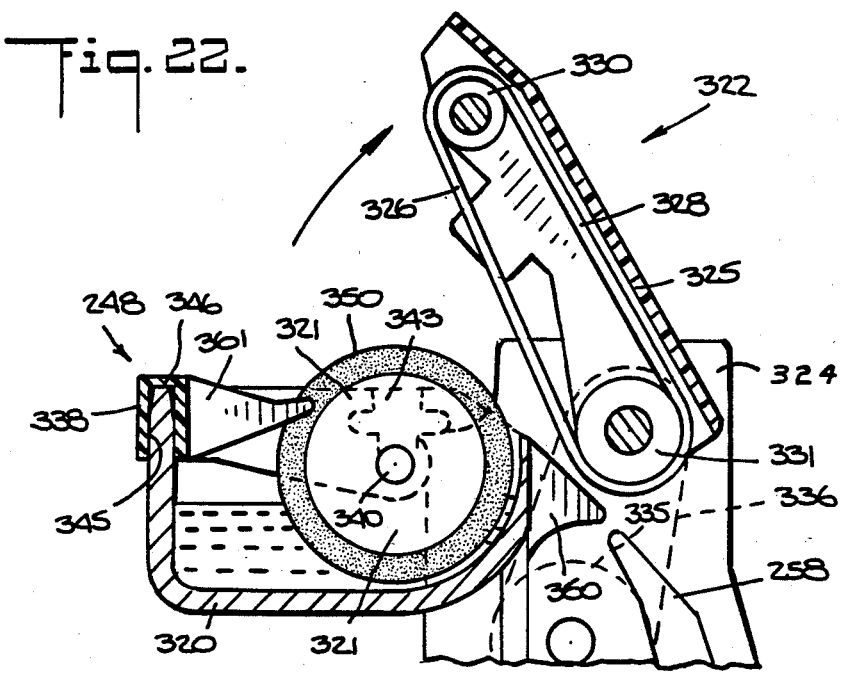

TORQUE OR FORCE LINEARIZING DEVICE

CROSS-REFERENCE TO RELATED APPLICATIONS

The following U.S. patent applications disclose the clutch device disclosed herein: Ser. No. 291,469, titled "TAPE DRIVE"; Ser. No. 291,480, titled "REELED TAPE SUPPLY"; Ser. No. 291,468, titled "TAPE TAKE-AWAY AND MOISTENING SYSTEM"; Ser. No. 291,466, titled "TAPE CUTTER"; Ser. No. 291,470, titled "SPRING CLUTCH DEVICE"; and Ser. No. 291,481, titled "ROLLED SHEET OR STRIP MATERIAL SUPPLY SYSTEM"; all filed on the same date as this application.

BACKGROUND OF THE INVENTION

The invention disclosed herein relates a device which linearizes a force/distance or torque/angle relationship of the device.

SUMMARY OF THE INVENTION

It is an object of the present invention to linearize the force/distance or torque/angle relationship, for example, of a spring or other device, particularly a torsion spring.

It is another object of the present invention to provide a constant spring tension device, particularly to provide a constant spring tension to a pivoting or rotating member.

The invention disclosed herein achieves the above and other objects in providing a device which receives a torque that varies with angle or a force that varies with distance from a spring or other device and converts it to a torque constant with angle or a force constant with distance in a range of interest.

In accordance with the invention, the device comprises a first gear section and a second gear section. The first and second gear sections are pivotally supported in a meshing relationship. The first gear section includes gear teeth extending about an arc of a first circle having a first center, and the second gear section includes gear teeth extending about an arc of a second circle having a second center. One of the gear sections is supported to pivot about an axis coaxial with the center of the circle about the arc of which its gear teeth extend, and the other gear section is supported to pivot about an axis which is eccentric with respect to the center of the circle about the arc of which its gear teeth extend. The two gear sections thus pivot eccentrically with respect to each other such a variable torque or force must be applied to one gear section to obtain constant torque or force from the other gear section, and vice versa.

In a disclosed embodiment, the spring tension vs. winding angle of a torsion spring is, i.e., the varying torque vs. spring winding angle characteristic of the spring is compensated so that the device may provide a constant torque that is constant with spring winding angle. The spring has a first end fixed against movement and a second end coupled to one of the gear sections. In a range of interest, the force to compress the spring and the force exerted by the spring are linear as taken from the remote gear section. In this embodiment, a constant torque may be obtained from the remote gear section from a simple torsion spring without active components.

The size of the gear section depends upon the nonlinearity of the force/distance, the radius the arcs and the range of interest.

BRIEF DESCRIPTION OF THE DRAWINGS

The invention is illustrated by way of example and not limitation in the figures of the accompanying drawings in which like references denote the same elements, and in which:

FIG. 6 is a perspective view of the tape selection part depicted in FIG. 5 in its condition which selects the lower tape;

FIG. 15 is a top view part of the tape track and part of the input conveyer shown in FIG. 14;

FIG. 16 is a sectional view of the tape track depicted in FIG. 15 taken along line 16—16 of FIG. 15;

FIG. 17 is a side view partially in section of the tape cutter subsystem of the tape module of FIG. 1;

FIG. 19 is a view similar to FIG. 18 with the diverter finger positioned to feed tape to bypass the moistener device;

FIG. 20 is a perspective view of the drive portion of the tape take-up and moistening subsystem;

FIG. 21 is a perspective view the spring arrangement which controls the position of the diverter finger of the tape take-up and moistening subsystem;

FIG. 22 is a side sectional view of the moistener device with the guide conveyer thereof in its open, service position;

FIG. 23 is an exploded perspective view of the moistener device;

DESCRIPTION OF THE PREFERRED EMBODIMENTS

Figure 1:
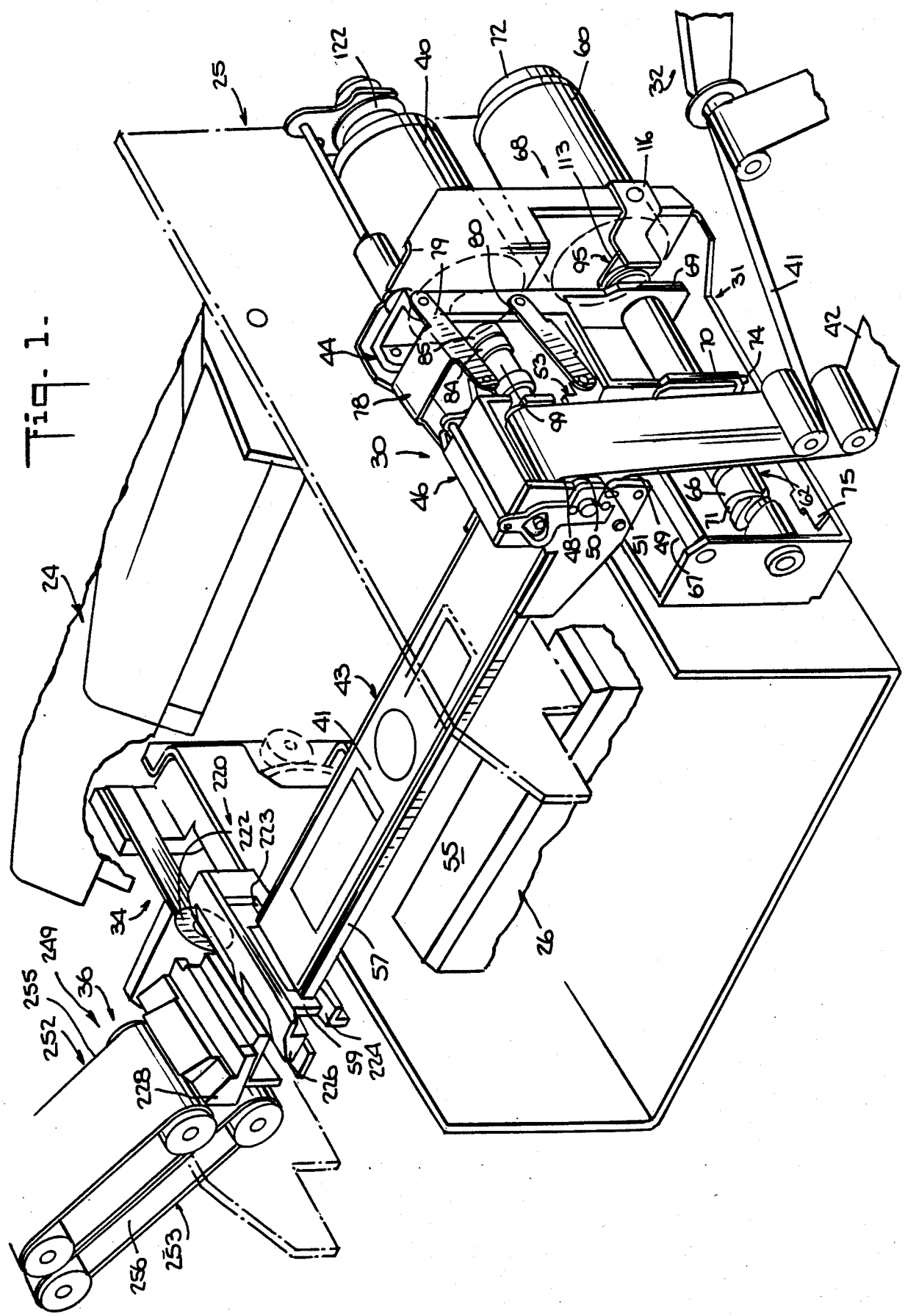
FIG. 1 is a perspective view of portions of a tape module according to the present invention for a mailing machine.

Referring to FIG. 1, among the subsystem modules which may be incorporated into a modular mailing machine of the type disclosed in patent applications referenced above are postage meter module 24, tape module 25, and platen module 26. Tape module 25 includes tape drive subsystem 30, tape carriage moving subsystem 31, tap reel subsystem 32 (partially shown in FIG. 1), tape cutting subsystem 34 and tape take-away and moistening subsystem 36 (partially shown in FIG. 1). Tape drive subsystem 30 (FIGS. 2-8) includes first drive motor 40 for selectively advancing tapes 41 and 42 towards a cantilevered track 43 on which the respective tape is imprinted with indicia by postage meter module 24. Tapes 41 and 42 may be different so as o provide versatility or they may be identical which doubles the amount of tape which may be dispensed by tape module 25 before resupply is necessary. For example, tape 41 may be a pre-glued (mucilage coated) tape which is moistened by subsystem 36, while tape 42 may be a laminated pressure sensitive tape which does not require moistening. After imprinting, the imprinted tape segment is severed by tape cutting subsystem 34 and supplied to tape takeaway and moistening subsystem 36 for moistening, where appropriate, and ejecting it from tape module 25.

Tape reel subsystem 32 (FIGS. 9-13) includes structure for holding two supply reels from which tapes 41 and 42 are drawn, and feed structure for supplying the tapes to tape drive subsystem 30. Tape reel subsystem 32 also includes structure for tensioning tapes 41 and 42 as they are withdrawn by tape drive subsystem 30, and includes structure which retracts into tape reel subsystem 32 a portion of a tape supplied to tape drive subsystem 30 that is not cut by cutting subsystem 34. Although it is preferred that the tap reel subsystem utilized with tape drive subsystem 30 be embodied by the one disclosed herein, other tape reel systems may be used as well.

Tape cutting subsystem 34 (FIGS. 14-17) severs tape 41 or 42 after imprinting by postage meter module 24 and includes structure for holding a tape as it is being cut. Although it is preferred that the tape cutting subsystem utilized with tape drive subsystem 30 be embodied by the one disclosed herein, other tape cutting subsystems may be used as well.

Tape take off and moistening subsystem 36 (FIGS. 18-25) includes structure capable of directing cut segments of tapes 41 and 42 along different paths, one path for moistening cut segments of either or both of tapes 41 and 42, and another path which bypasses moistening device in subsystem 36. Tape take off and moistening subsystem 36 further includes structure for directing cut segments of tapes to the exit of tape module 25 from which the tap segments may be applied to envelopes, labels, etc. Although it is preferred that the tape takeaway and moistening subsystem utilized with tape drive subsystem be embodied by the one disclosed wherein, other tape take-away and moistening subsystems may be used as well.

Referring to FIG. 1, tape track 43 is supported in cantilever fashion by a movable tape carriage 44 which also supports tape advancing means 46 comprising drive rollers 48, 49 (FIG. 2) and idler rollers 50, 51 for selectively advancing either tape 41 or tape 42 along track 43. Tape 41 is fed into the nip of drive roller 48 and idler roller 50 and tape 42 is fed into the nip of drive roller 49 and idler roller 51. As described below, first coupling means 53 (FIGS. 3-6) selectively couples tape drive motor 40 to drive either drive roller 48 or drive roller 49 to selectively advance tape 41 or tape 42 to track 43.

Postage meter module 24 (FIG. 1) includes a printing matrix (not shown) which imprints indicia either on an exposed tape 41 or 42 on track 43 or on envelopes depending on the position of tape track 43. Un-imprinted tapes 41 and 42 from tape reel system 32 are fed into tape advancing means 46 which is pivotally coupled to and supported by tape carriage 44 for vertical movement relative thereto. Track 43 includes guide structure at its edges for guiding tapes 41 and 42 in two layers along tape track 43, such that each may individually be selectively advanced or retracted. One or the other tape may therefore extend under at least a portion of the indicia printing matrix in postage meter module 24 when track 43 is moved thereunder in response to a demand for an imprinted tape. Platen module 26 includes platen 55 which is raised vertically during printing to impact either the exposed tape or an envelope against the printing matrix. As depicted in FIG. 1, postage meter module 24 is in a service position pivoted away from platen module 26. Platen 55 is aligned with the line of flow of mail through postage enter module 24, and in use, postage meter module 24, which may be of the flat bed mailing type, is normally horizontally situated above plate 55, with the printing matrix not shown, directly above and vertically registered with platen 55. In the home position of tape track 43 depicted in FIG. 3, front edge 57 of tape track 43 is behind platen 5 and behind the line of mail flow which is above and along platen 55. With track 43 in its home position, envelopes moved in the line of mail flow through postage meter 24 are imprinted upon an imprinting demand. In the printing position tape carriage 4 is moved forwardly to position tape track 43 above platen 55 and the exposed tape thereon is imprinted in response to an imprinting demand. The printing matrix (not shown) in postage meter mailing module 24 is inked by an inking module (not shown), and prints postage and/or other indicia on an exposed tape on track 43 which is impacted against the printing matrix.

Figure 2:
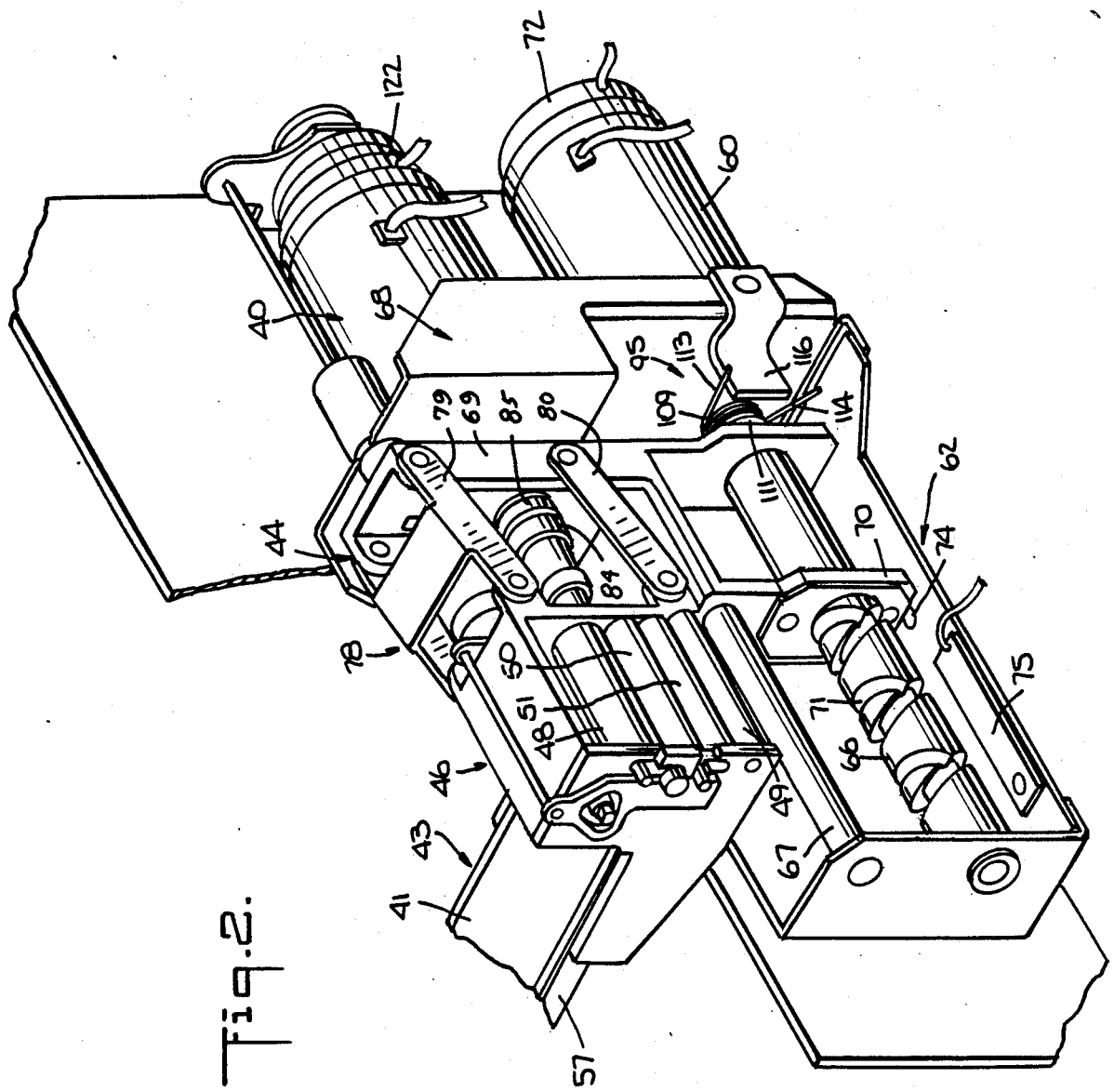
FIG. 2 is a perspective view of the tape drive subsystem of the module of FIG. 1.
Figure 3:
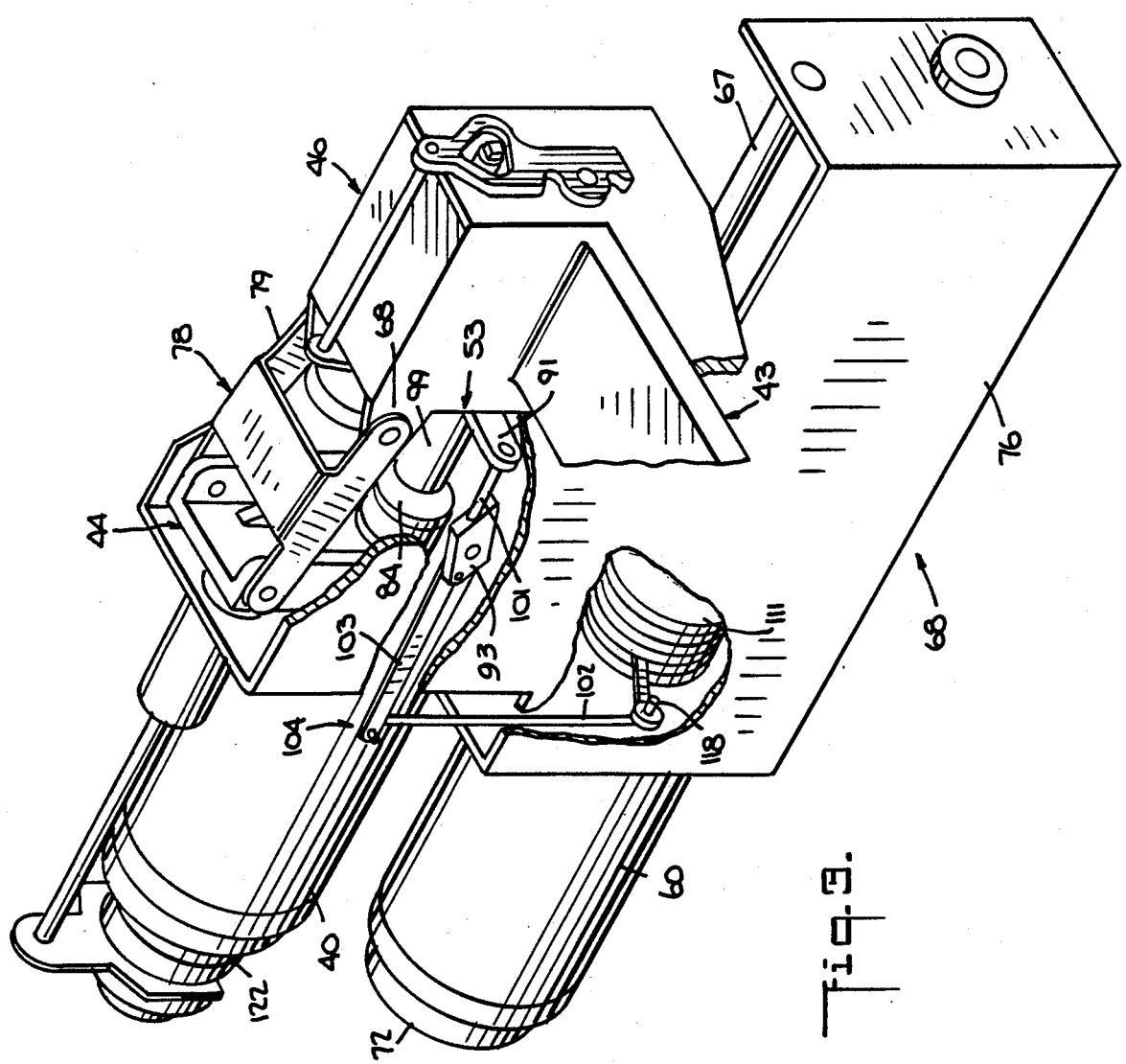
FIG. 3 is a perspective view, partially broken away, of the drive mechanism portion depicted in FIG. 2 but from the opposite side.
Figure 4:
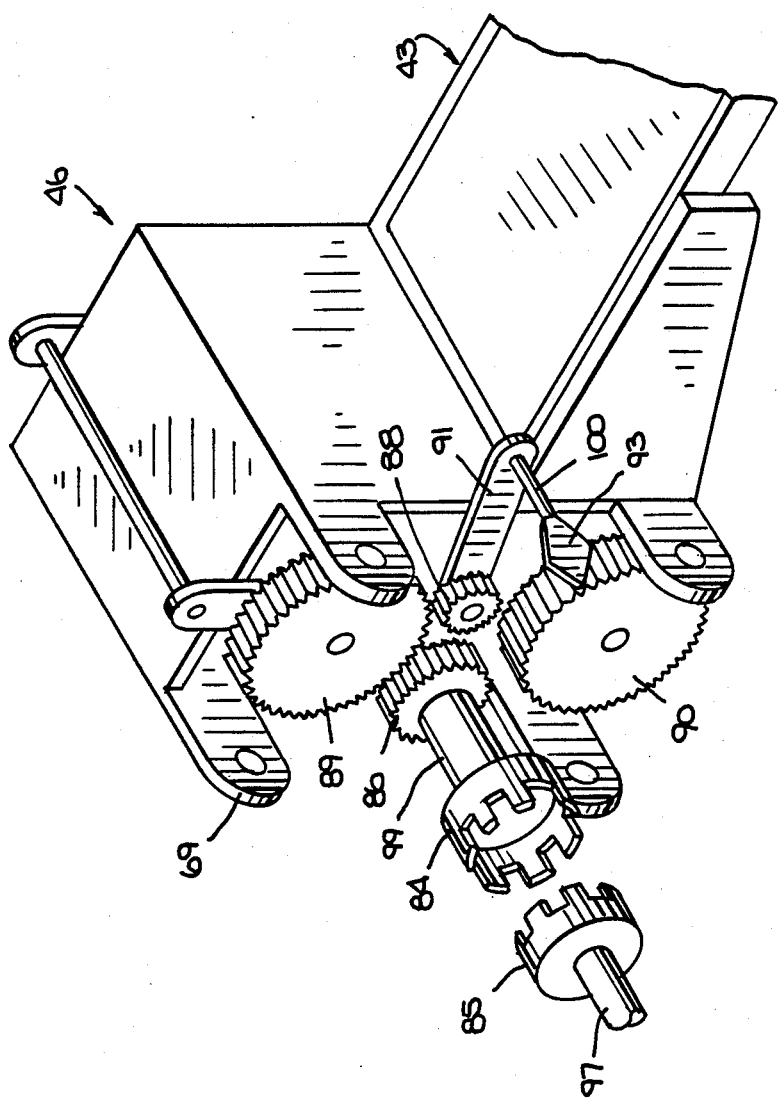
FIG. 4 is a perspective view of the gearing and lead screw parts of he drive mechanism portion of the tape drive subsystem of FIG. 2 depicted in an enlarged scale as compared to that of FIG. 2.
Figure 5:
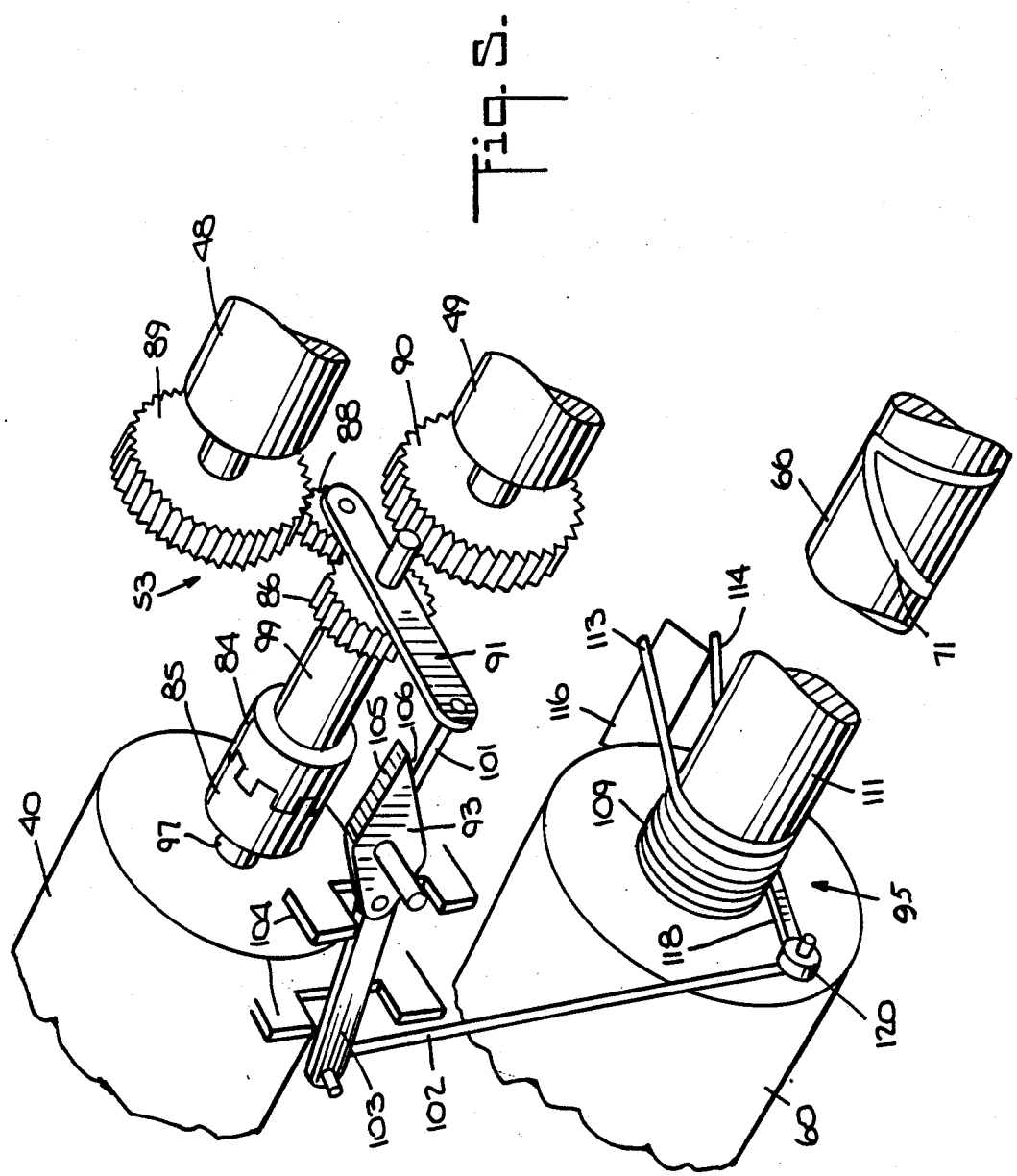
FIG. 5 is a perspective view of the tape selection part of the tape drive subsystem of FIG. 2, in an enlarged scale as compared to that of FIG. 2, and in its condition which selects the upper tape.

Tape carriage 44 is moved by tape carriage moving subsystem 31 when there is a demand for imprinting tape. Tape carriage moving subsystem includes tape carriage drive motor 60 and second coupling means which moves track 43 into a printing position adjacent platen module 26 and back to the home position shown in FIG. 1. Second coupling means 62 comprises a lead screw arrangement coupling carriage 44 to tape carriage dried motor 60 for forward and backward movement between the rest and printing positions referred to above. The lead screw coupling arrangement 62 includes bidirectional lead screw 66 and associated mounting structure. Referring to FIG. 2, carriage 44 is supported on lead screw 66 and guide rod 67 by bracket 68 for movement along lead screw 66 and guide rod 67.

Bracket 68 includes a pawl 70 functioning as a helix follower which is nested in helical grooves 71 of lead screw 66 and is constrained to move, taking carriage 44 with it, along lead screw 66 in a forward (left in FIG. 2) direction from the home position to the printing position (not shown) above platen 55 and in a backward direction back to the home position.

The design of the helical grooves 71 enables pawl 70 to move forward and backward along lead screw 66 regardless of the direction of rotation of the lead screw. Lead screw 66 and helical grooves 71 are fabricated to provide a given back and forth horizontal movement of carriage 44 for a given rotation of lead screw 66 in either direction. The excursion of carriage 44 is precisely determined to insure proper registration of a tape and the printing head in postage meter module 24. A shaft encoder 72 measures the angular position of lead screw 66. For example, with a shaft encoder subdividing a complete revolution of lead screw 66 into 1024 increments, and a lead screw/helical groove arrangement which requires 4.5 lead screw revolutions to advance carriage 44 and track 43 the desired distance from the home to the printing position and back again, 9216 increments of shaft encoder are required, which can precisely be detected by control circuitry including means for accumulating encoder counts.

In addition the maximum forward excursion of carriage 44 may be set by magnet 74 attached to pawl 70 and the position of a Hall sensing device 75 attached to the base of bracket 68 supporting lead screw 66. Thus, when the Hall device 75 detects the presence of magnet 74, rotation of the lead screw 66 is stopped to halt forward excursion of carriage 44, and the accumulated encoder count is noted. To commence rearward excursion of carriage 44 back to the home position, lead screw 66 is again rotated in either direction and the encoder counts again accumulated. As mentioned above, it does not matter which direction lead screw 66 is rotated. Thus, it may be rotated in one direction to forwardly advance the carriage and either in the same or opposite direction to rearwardly retract the carriage, and vice versa. For retraction, when the same encoder count is accumulated as in the forward direction excursion, that count is taken as indicative of the carriage having reached the home position and rotation of lead screw 66 is again stopped. Conventional electronic circuitry to accomplish the foregoing may be utilized.

A parallelogram or four-bar linkage 78 is provided to suspend tape advance mechanism 46 and track 43 and to stabilize and guide track 43 for parallel vertical movement relative to carriage 44 towards postage meter module 24 during tape imprinting, and back again after imprinting. Parallelogram linkage 78 includes carriage 44, and links 79 and 80 pivotally coupled to carriage 44 and tape advance mechanism 46.

Tape module 25 operates as follows. With a segment of a desired tape 41 or 42 exposed on track 43, lead screw 66 is rotated to position track 43 in the printing position above platen 55. An actuator mechanism (not shown) causes platen 55 to rise and urge track 43, as guided by parallelogram linkage 78, towards the printing matrix in postage meter module 24, which if suitably inked will imprint indicia upon the selected tape. Tape track 43 therefore functions as an auxiliary platen to platen 55 during printing. Tap carriage drive motor 60 is then energized to complete the rotation of bidirectional lead screw 66 and return track 43 back to its home position behind platen 55. FIG. 1 shows an imprinted tape still residing on track 43. After track 43 has been returned to its home position, tape drive motor 40 advances the exposed tap so as to advance the imprinted segment past the remote end of track 43, where tape cutting subsystem 34 severs the imprinted segment from the remainder of the tape, which is received by tape take-away and moistening subsystem 34 and ejected from the tape module as described below. Tapes 41 and 42 are then retracted and/or advanced in preparation for the next tape imprint demand. If the demand is to imprint lower tape 42, upper tape 41 is retracted by tape drive motor 40 to expose lower tape 42. If upper tape 40 is to be imprinted, it may simply remain in position.

However, since the printing matrix in postage meter module 24 may no imprint the exposed tape starting immediately at the edge of track 43, if the exposed tape were not retracted slightly, a portion of the tape would not be imprinted. This would result in tape wastage and would force the tape to occupy more space on the envelope or label to which it is adhered than it otherwise would. Therefore, the exposed tape remaining on track 43 after the imprinted segment is cut is slightly retracted. Retracting may be accomplished by an active system, activate for example, by tape drive motor 40, or by a passive system associated with tape reel subsystem 32, described below, or a combination of both subsystems.

The first coupling means 53 for effecting tape selection depicted in FIGS. 3-6 enables a single motor (tape drive motor 40) to drive both tapes 41 and 42. First coupling means 53 includes coupling member halves 84 and 85, driving gear 86, idler gear 88, upper and lower driven gears 89, 90, all driven by tape drive motor 40; and change lever 91, change wedge 93 and a spring arrangement 95 coupled to tape carriage drive motor 60 for effecting a change from driving one tape to the other.

Coupling member half 84 is engaged by mating coupling member half 85 coupled to shift part 97 of tape drive motor 40. Coupling member half 84 and driving gear 86 are fixed to rotate with shaft portion 99. Driving gear 86 engages via idler gear 88 either upper driven gear 89 for rotating upper roller 48 or lower driven gear 90 for rotating lower roller 49. Idler gear 88 is moved into meshing engagement between gears 86 and 89 or between gears 86 and 90 by lever 91 to which idler gear 88 is rotatably attached. Pin 101 attached to lever 91 projects therefrom to be engaged by wedge 93 to pivot lever 91 up (counterclockwise) or down (clockwise). Wedge 93 is pivotally supported and coupled to spring arrangement 95 via rocker lever 103 pivotally mounted in notch 104 and push-pull rod 105. Wedge 93 has inclined upper and lower surfaces 105, 106 which coact with pin 101 to cam lever 91 up and down. When lever 91 is cammed to its upper position depicted in FIG. 6, it meshes idler gear 88 between driving gear 86 and upper driven gear 89; and when cammed into its lower position depicted in FIG. 5, lever 91 meshes idler gear 91 between driving gear 86 and lower driven gear 90.

Spring arrangement 95 (FIG. 5) includes a dual coil spring 109 mounted on arbor 111 adjacent tape carriage drive motor 60. Coil spring 109 includes circumferentially spaced tang ends 113, 114 which project adjacent opposed sides of interceptor element 116. Tang ends 113, 114 are spaced so that only one tang end engages interceptor element 116 at a time. Arbor 111 is mounted on lead screw 66 to rotate therewith. As arbor 111 rotates in either direction, one or the other of tang ends 113, 114 engages interceptor element 116 which causes spring 109 to unwind and permits arbor 111 to rotate with a much reduced frictional torque, which is a property of wraps spring clutch devices, so that arbor 111 rotates a fraction of a revolution for each revolution of lead screw 66. Coil spring 109 further includes dual center tangs 118 which engage pin 120 attached to push-pull rod 105 and move rod 105 up and down in accordance with the direction of rotation of lead screw 66. Thus, rotation of lead screw 66 in one direction causes upper driven gear 89 for upper roller 48 and upper tape 40 to be engaged and driven, and rotation of lead screw in 66 the opposite direction causes lower driven gear 90 for lower roller 49 and lower tape 42 to be engaged and driven.

Thus, irrespective of the direction that tape carriage drive motor 60 rotates during forward advancement of tape carriage 44 and tape track 43 to the imprinting position therefor, the direction of rotation selected for tape carriage drive motor 60 on the return of tape carriage 44 and track 43 to the home position determines whether the upper 105 or lower surface 106 of wedge 93 engages pin 101 to pivot lever 91, and thus urge idler gear 88 into meshing engagement with either upper driven gear 89 or lower driven gear 90. In order to meter the required length of tape, an incremental shaft encoder 122 (FIG. 1) is incorporated into tape drive motor 40.

Figure 8:
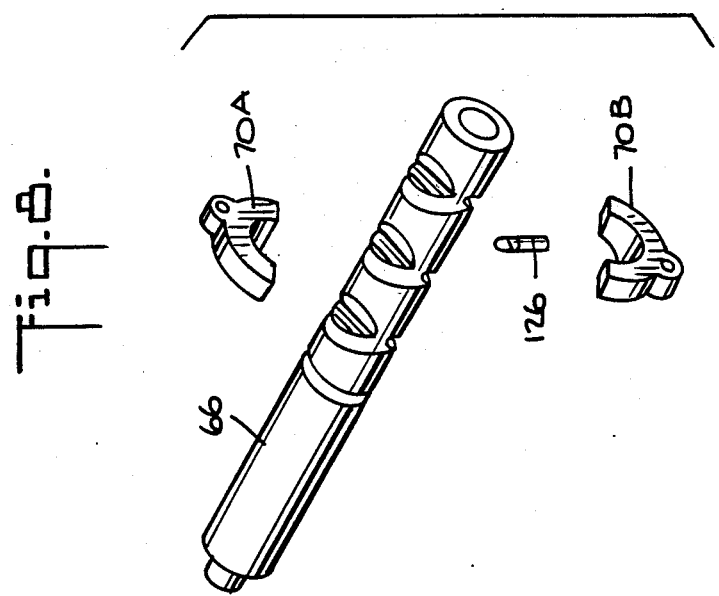
FIG. 8 is an exploded perspective view of the lead screw and part of the support depicted in FIG. 7.
Figure 7:
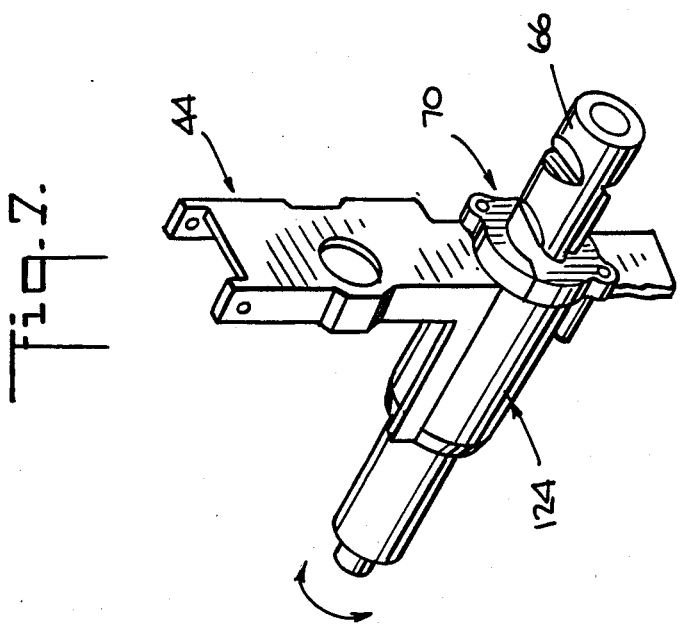
FIG. 7 is a perspective view of the lead screw and its support which are part of the carriage moving mechanism depicted in FIG. 2.

Referring to FIGS. 7 and 8, tape carriage 44 is mounted to lead screw 66 by bearing 124 and pawl 70. For ease of assembly and disassembly, pawl 70 is split and includes pawl halves 70A and 70B, and helix follower 126. Pawl halves 70A, 70B are each fastened to bearing 124 by respective screws.

Referring to FIGS. 9-13 tape reel subsystem 32 includes tape eels 150 and 151 from which tapes 40 and 41, respectively, are withdrawn by tape drive subsystem 30. Reels 150, 151 include hubs 152, 153 which are rotatably supported by spindles 155, 156 secured to frame 157. Tape 41 is fed from reel 150 to tape drive subsystem 30 via idler roller 159, roller 160 carried by tension arm 161 and idler roller 162. Tape 42 is similarly fed from reel 151 to tape drive subsystem 30 via idler roller 164, roller 165 carried by tension arm 166 and idler rollers 167 and 168.

Tension arms 161, 166 are rotatably supported at one end thereof by spindles 155, 156, respectively, and each pivots about the axis of the respective spindle 155, 156 to move its respective roller 160, 165 along respective arcs defined by curved slots 170, 171. Tension arms 161, 166 are urged to rotate in a counterclockwise direction by respective tensioning devices 173 (FIG. 10) and thereby tension respective tapes 41, 42 as they are withdrawn from reels 150, 151 by tape drive subsystem 30. Tension arms 161, 162 function as lever arms in that they divide the tension provided by tensioning devices 173. Tape reels 150, 151 and the respective tensioning devices, tension arms and rollers used in supplying tapes 40 and 41 under tension to tape drive subsystem 30 are the same. Therefore, tape reel 151 and its associated tension arm, tensioning device and rollers are described below in more detail with th understanding that such description applies also to tape reel 150 and its associated tension arm, tensioning device and rollers.

Figure 9:
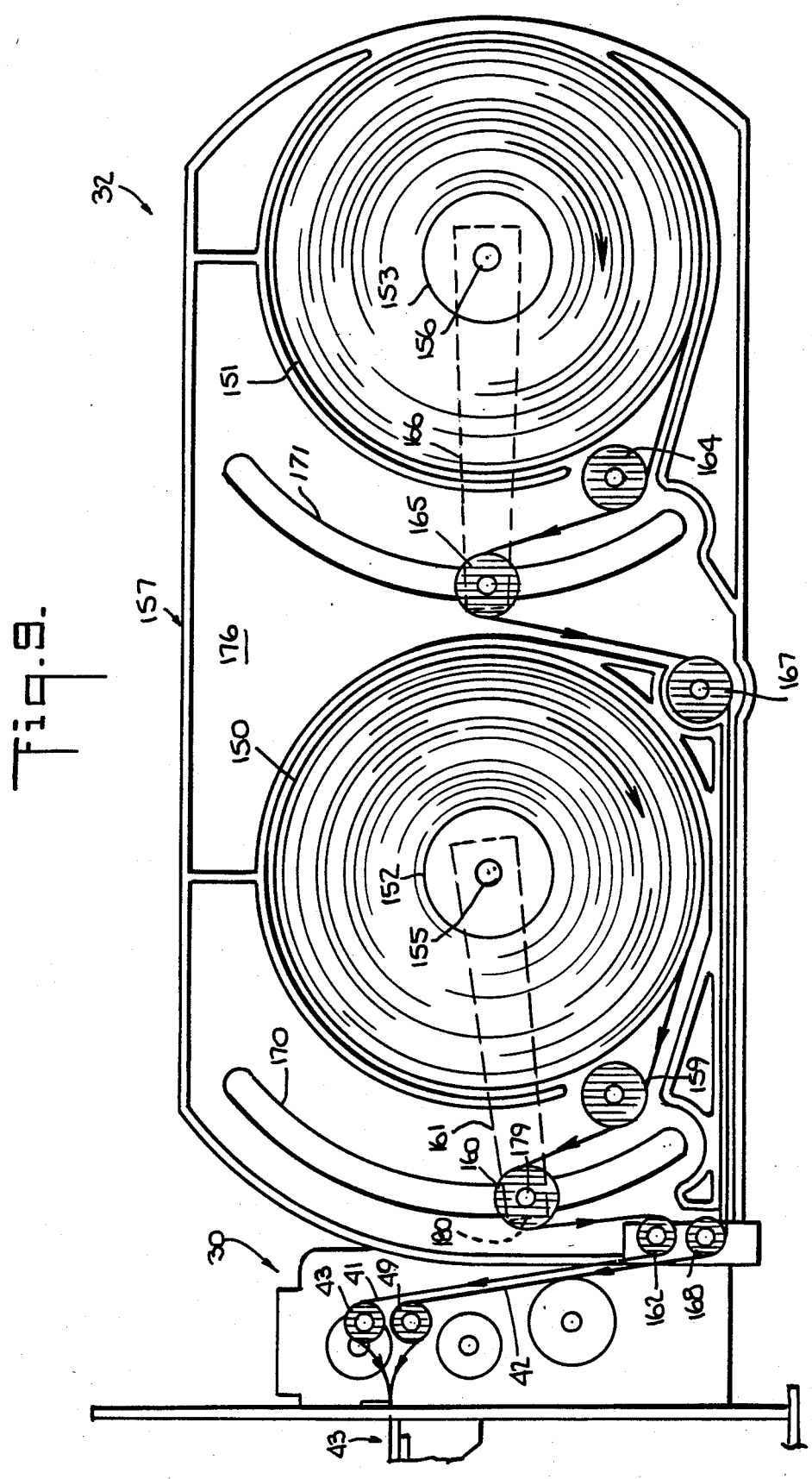
FIG. 9 is a side view of the tape reel subsystem of the tape module depicted in FIG. 1.
Figure 10:
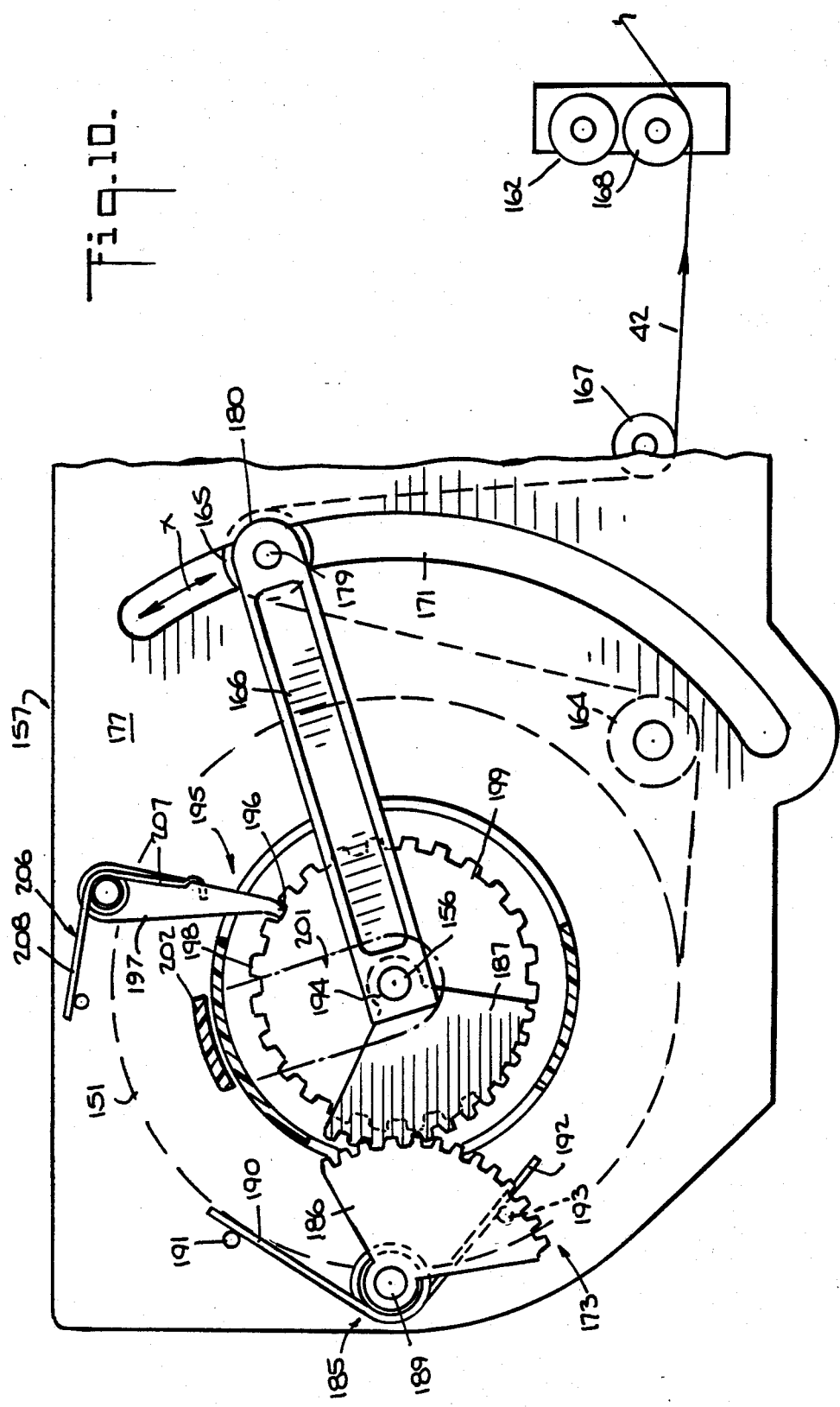
FIG. 10 is a side view of part of the tape reel subsystem depicted in FIG. 9 from the opposite side thereof showing the reel locked against rotation.

Referring to FIGS. 9 and 10, reel 151 is disposed on one side 176 (FIG. 9) of frame 157 and tension arm 166 is disposed on the opposite side 177. Referring to FIG. 10, tension arm 166 carries a spindle 179 at its free end 180 which projects through curved slot 171 to frame side 176 (FIG. ). Spindle 179 rotatably carries roller 165 over which tape 42 is drawn. Tension arm 166 pivots in response to changes in the tension on tape 42 as tape 42 is withdrawn from reel 150 by tape drive subsystem 30 An increase in tension causes tension arm 166 to pivot in a clockwise direction and spindle 179 to move downwardly in slot 171. Tensioning device 173 urges tension arm 166, which functions as a lever dividing the force of tensioning device 173, in a counterclockwise direction with respect to FIG. 10 Tensioning device 173 includes torsion spring 185, gear section 186 and gear section 187. Spring 185 is carried on shaft 189 with one tang 190 engaging pin 191 fixed to frame 157 and its other tang 192 engaging pin 193 fixed to gear section 186. Gear section 187 is fixed to tension arm 166 to pivot therewith about spindle 156. Gear sections 186, 187 include meshing teeth such that pivoting of tension arm 166 causes pivoting of gear section 186 against the action of spring 185. Thus, clockwise pivoting of arm 166 in response to increased tension on tape 42 causes spring 185 to be compressed and to resist pivoting of arm 166. Tension arm 166 is thereby pivoted to take up any slack in tape 42 when there is a decrease in tension on tape 42.

The pivot axis 194 of gear section 187 is not the geometric center of the gear segment. The same is true of gear segment 186 with respect to pivot axis 189. Ideally, gear segments 186 and 187 are a non-circular gear pair. However, for lightly loaded applications with not too extreme a location difference between the geometric and pivotal centers and with limited angular rotation, eccentrically pivoted circular gears can be used. The instantaneous mating radius of gear segment 187 increases as it rotates in a clockwise direction. The corresponding radius of mating gear segment 186 decreases as it is driven in a counterclockwise direction by segment 187. As segment 186 rotates in a counterclockwise direction, torsion spring 185 produces an increasing force against pin 193 as it is wound tighter. The instantaneous radii of gear segments 186 and 187 are designed so that they compensate for the increase in torque produced by the counterclockwise winding of torsion spring 185 about pivot 189. The varying torque vs. spring winding angle characteristic of spring 185 is compensated by the eccentric mounting of gear segment 187 so that a torque constant with winding angle is obtained at gear 187 for the winding and unwinding of spring 185. This results in a constant torque applied to tension arm 166 and, therefore, a constant tension applied to tape 42.

Thus, movement of tension arm 166 takes up shock on tape 42 as it is withdrawn from reel 150. This reduces the stress on tape 42 and prevents it from tearing. With tensioning device 173 urging tension arm 166, a constant tension is applied to tape 42 as it is withdrawn. Movement of tension arm 166 also retracts tape 42 into tape reel subsystem 32 and takes up tape slack so that there is no excess tape in subsystem 32.

Figure 12:
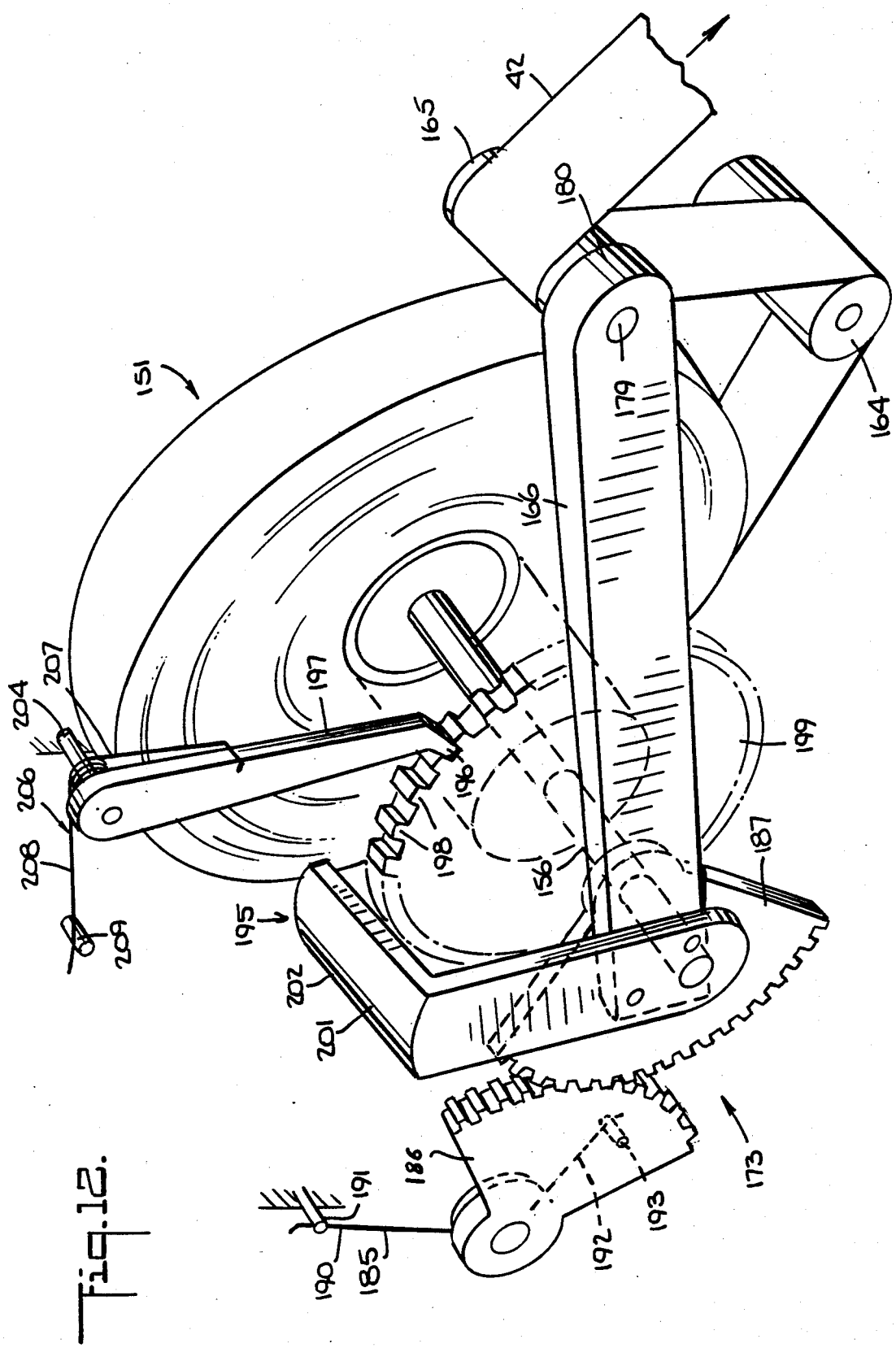
FIG. 12 is an exploded perspective view of the reel and locking mechanism depicted in FIGS. 10 and 11.
Figure 13:
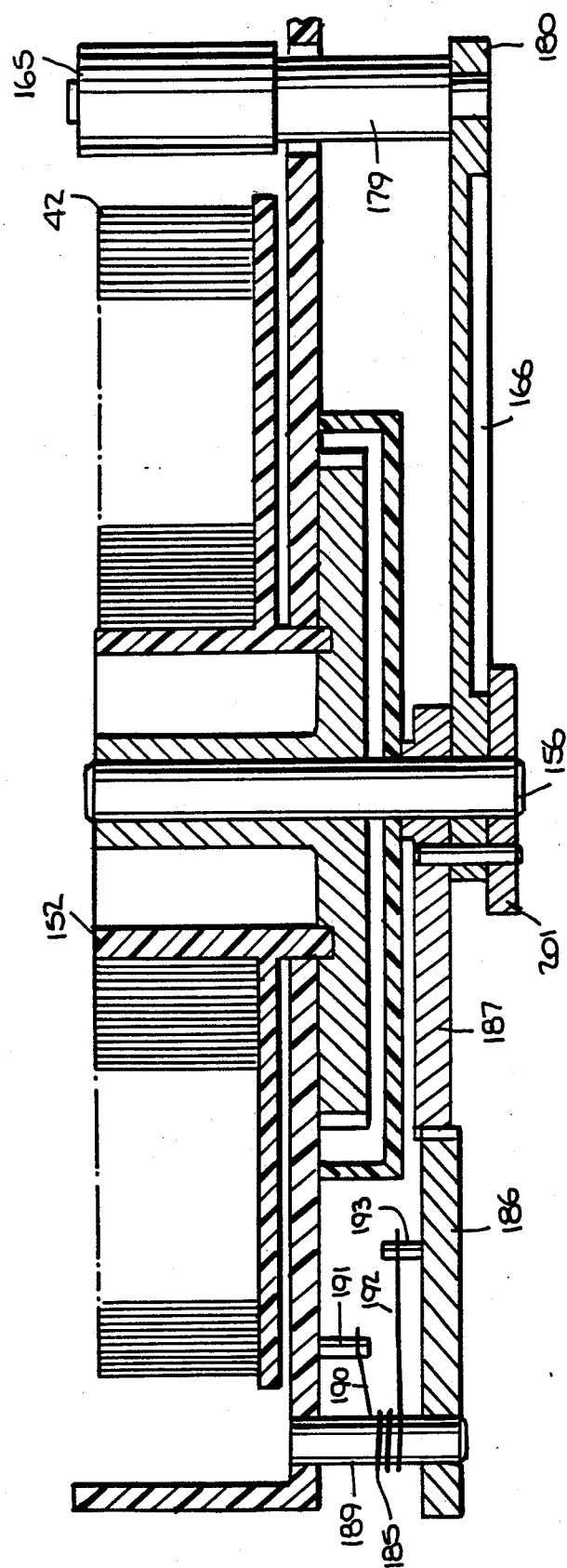
FIG. 13 is a sectional view of the reel and its locking mechanism taken along line 13—13 of FIG. 11.

Referring to FIG. 12, pawl and ratchet mechanism 195 locks reel 151 against rotation when end 196 of pawl 197 is engaged between cogs or teeth 198 of ratchet wheel 199. Ratchet wheel 199 is free to rotate on but engages reel 151 by means of three prongs of cylindrical cross section which mate with the tape roll bobbin so that ratchet wheel 199 turns as tape is being withdrawn from reel 151. Gear section 187 and tension arm 166 rotate freely relative to ratchet wheel 199. Pawl release arm 201 is fixed to tension arm 166 on spindle 156 and pivots with tension arm 166. Release arm 201 includes a flanged portion 202 which extends inwardly towards pawl 197 so as to engage pawl 197 as tension arm 166 is pivoted clockwise in FIG. 12. Pawl 197 is pivotally supported from frame 157 by pin 204 so that pawl end 196 may be moved into and out of engagement between teeth 198 of ratchet wheel 199. Torsion spring 206, also supported from pin 204, has one tang 207 engaging pawl 197 and its other tan 208 engaging pin 209 fixed to frame 157. Spring 206 therefore urges pawl 197 to pivot in a clockwise direction in FIG. 12 into engagement between teeth 198, and release arm 201 engages pawl 197 as release arm 201 is pivoted clockwise in FIG. 12 to disengage pawl 197 from ratchet wheel 199. The force of spring 206 is sufficient to maintain pawl 197 engaged in ratchet wheel 199 when a demand for tape is made by tape drive subsystem 30, which locks reel 151 against rotation until such time as pawl 197 is released by release arm 201. Pawl 197 also acts as a brake for reel 151 when end 196 is in contact with but not engaged by teeth 198.

Tape reel subsystem 32 operates as follows. Referring to FIG. 10, reel 151 is locked against rotation by pawl and ratchet mechanism 195 when there is no demand for tape. When a demand for tape is made by tape drive subsystem 30 and/or tape segment take-away subsystem 36, tension arm 166 is pivoted clockwise as tape 42 is withdrawn by tape drive subsystem 30. Continued advancement of tape 42 continues to pivot tension arm 166, with reel 151 locked and tape being withdrawn from tape reel subsystem 32 due solely to movement of roller 165 downwardly along the arc defined by slot 171. Initially, tension arm 166 pivots clockwise and reel 151 is locked to supply a length of tape corresponding to the maximum arc along which roller 165 moves before unlocking reel 151, i.e. "x" amount of tape is supplied before reel 151 is unlocked. When tension arm 166 has been pivoted to the position depicted in FIG. 11, pawl release arm 201 moves into contact with pawl 197. Further pivoting of tension arm 166 causes pawl release arm 201 to pivot pawl 197 and release pawl 197 from engagement with ratchet wheel 199, thereby unlocking reel 151 and permitting it to rotate. As demand for tape 42 continues, it is withdrawn from reel 151 and roller 165 "dances" along the arc of slot 171 as the tension created on tape 42 by tape drive subsystem 30 changes. The equilibrium tension on tape 42 is constant regardless of the pivoted position of tension arm 166 (with reel 150 unlocked) due to the linearity compensation provided to spring 185 by eccentric mounting of gear section 187, as described above.

It is preferred that the arc along which roller 165 "dances" when reel 151 is unlocked be about 30 degrees and be about 60 degrees when reel 151 is locked.

Figure 11:
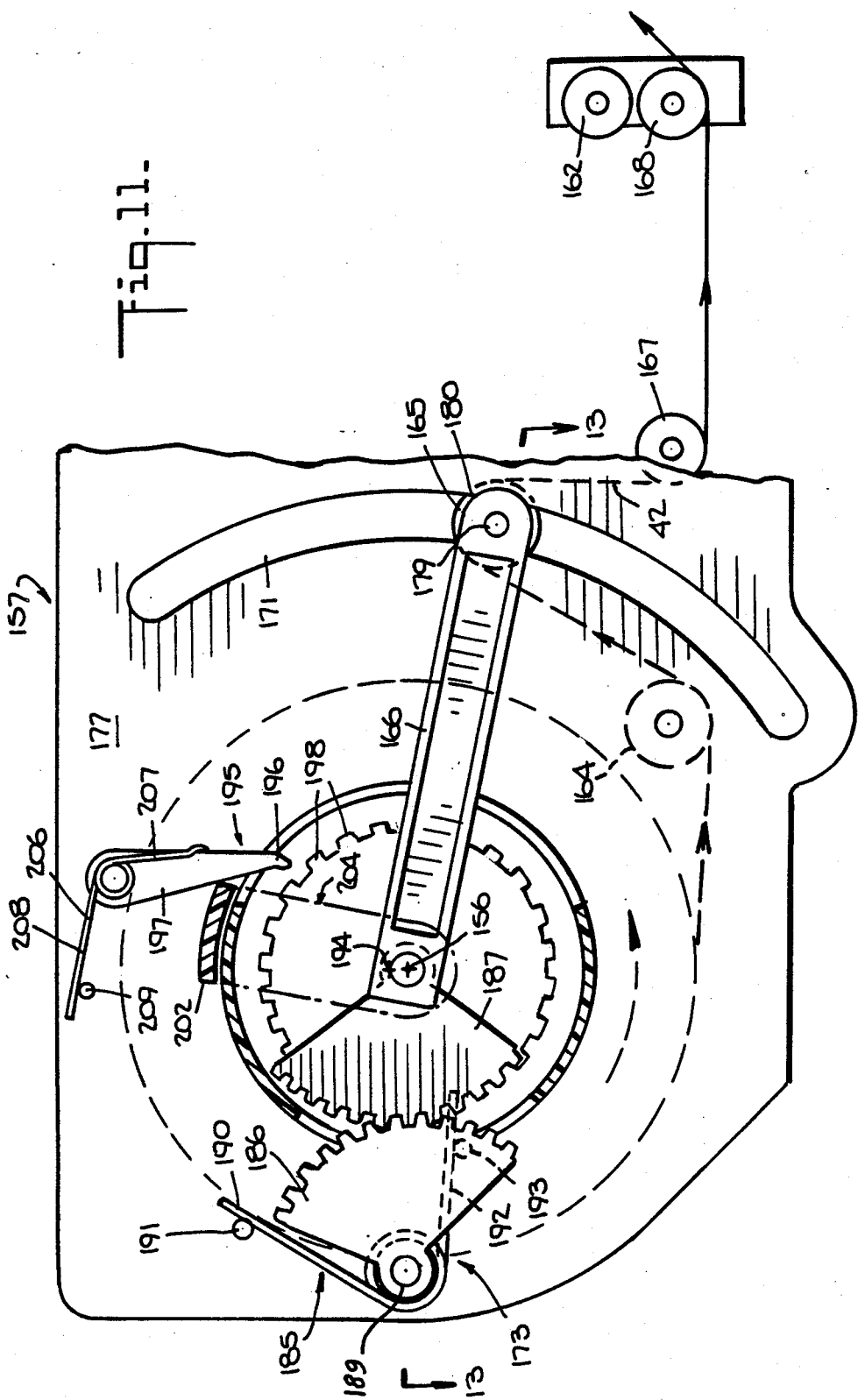
FIG. 11 a side view similar to that of FIG. 10 showing the reel unlocked and free to rotate.

When demand for tape 42 by tape drive subsystem 30 and/or tape segment take-away subsystem 36 ceases, and with tension maintained on tape 42, reel 151 is stationary but unlocked as depicted in FIG. 11. Thus, tension arm 166 pivots to take up tape slack. Tape drive subsystem 30 retracts tape 42 away from subsystem 36 along tape track 43, and tension arm 166 retracts tape 42 into subsystem 32 by pivoting counterclockwise under the action of spring 185 back to the position depicted in FIG. 10 where it locks reel 151 against rotation. Reel 151 is therefore not permitted to spin when there is no demand for tape, and the tension on tape 42 is maintained constant. Tension arm 166 may pivot further counterclockwise to the position depicted in FIG. 10, and in doing so retracts tape 42 a distance into tape reel subsystem 32 corresponding to the distance "x" between roller 165 and the upper end of slot 171. As discussed above, the printing matrix in postage meter module 24 may not imprint the exposed tape starting immediately at the edge of track 43. therefore the tape is retracted slightly after cutting so that the un-imprinted portion of the tape is not wasted. As mentioned, tape retraction performed by tape reel subsystem 32 is passive, i.e., the active element such as a motor or solenoid is not used, although active tape retraction may be used.

Figure 14:
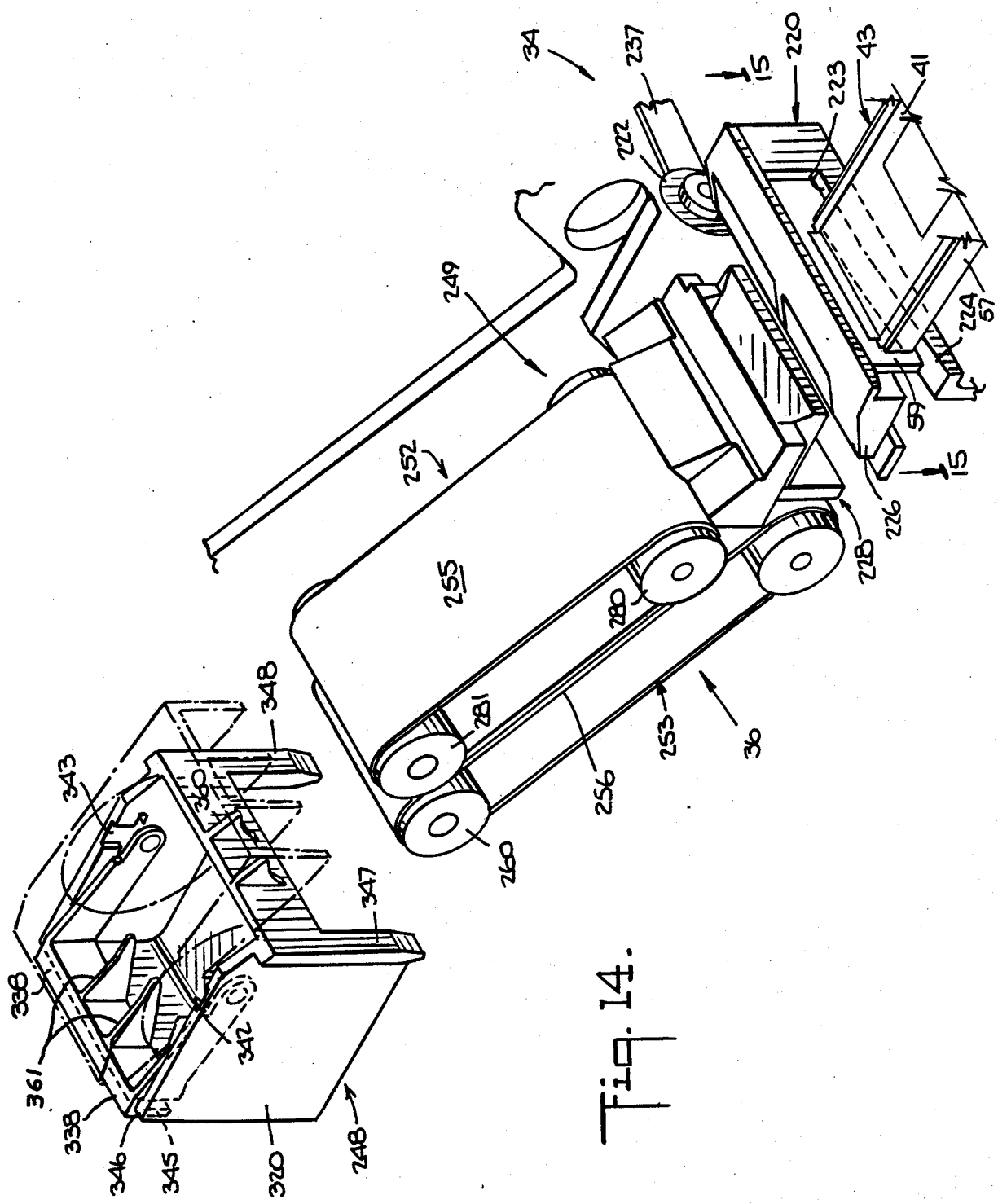
FIG. 14 is an exploded perspective view of the input conveyor and moistener device of the tape take-up and moistening system and part of the tape track of tape drive subsystem of the tape module of FIG, 1.

Referring to FIG. 14, after imprinting, tape 41 or 42 is advanced into tape take-away subsystem 36. When the imprinted portion of the tape passes the end 59 of track 43 and dock 220, tape is cut by cutting wheel 222 of tape cutting subsystem 34. In the home position of tape track 43 depicted in FIGS. 14, 15 and 16, end 59 is received in dock 220, and in the imprinting position, track 43 is moved out of dock 220 (to the left in FIG. 14) so it may be moved by platen 55 upwardly against the printing device in postage meter module 24. Dock 220 includes portion 223 which loosely receives tape track end 59 therein and aligns track 43 with output guide 226 of dock 220. To facilitate entry of tape track end 59 into dock portion 223, dock 220 also includes a larger portion 224 which is tapered to cam track end 59 into the smaller portion 223. Output guide 226 confines the tape to avoid buckling or displacement during a cutting operation.

Tape output guide 226 of dock 220 is spaced from a tape input guide 228 of tape take-away subsystem 36 to allow cutting wheel 222 to traverse the tape and cut it. Cutting wheel 222 is reciprocated by tape cutting subsystem 34 between the solid and broken line positions depicted in FIG. 17. Drive system 229 for reciprocating cutting wheel 222 includes drive motor 230, gear 232 fixed to shaft 233 of motor 230, gear 235 supported for rotation meshed with gear 232, and bracket 237 which carries cutting wheel 222. Bracket 237 includes a vertical slot 239 and gear 235 ha affixed thereto adjacent the periphery therefor a pin 241 which is disposed generally centered in slot 239 in the home position of cutting wheel 222 depicted in solid lines in FIG. 17. Bracket 237 includes hollow tubular portions 242, 243 which slidably receive rods 244, 245 fixed to the frame of 246 of tape module 25 to movably support bracket 237 and cutting wheel 222. Rotation of gear 235 in either direction causes pin 241 to ride in slot 239 an move bracket 237 to the left until bracket 237 reaches the broken-line position with pin 241 again generally centered in slot 339. Continued rotation of gear 235 in either direction causes pin 241 to again ride in shaft 239 and return bracket 237 to its solid-line home position. Thus, rotation of shaft 233 in the same direction causes cutting wheel to traverse tape 40 to cut it and then return to the home position. Alternatively, the direction of rotation of shaft 233 may be reversed at either of the solid and broken-line positions depicted in FIG. 17 to reciprocate bracket 237. A shaft encoder (not shown) may be used to accurately determine when motor 230 has rotated shaft 233 to position cutting wheel 220 in its extreme reciprocated positions. The rotational axis of cutter wheel 220 in relationship to tape output guide and stationary cutter blade 226 is other than 90 degrees, for example 89 degrees, rather greater or less, namely a one degree cutter angle of attack.

Figure 18:
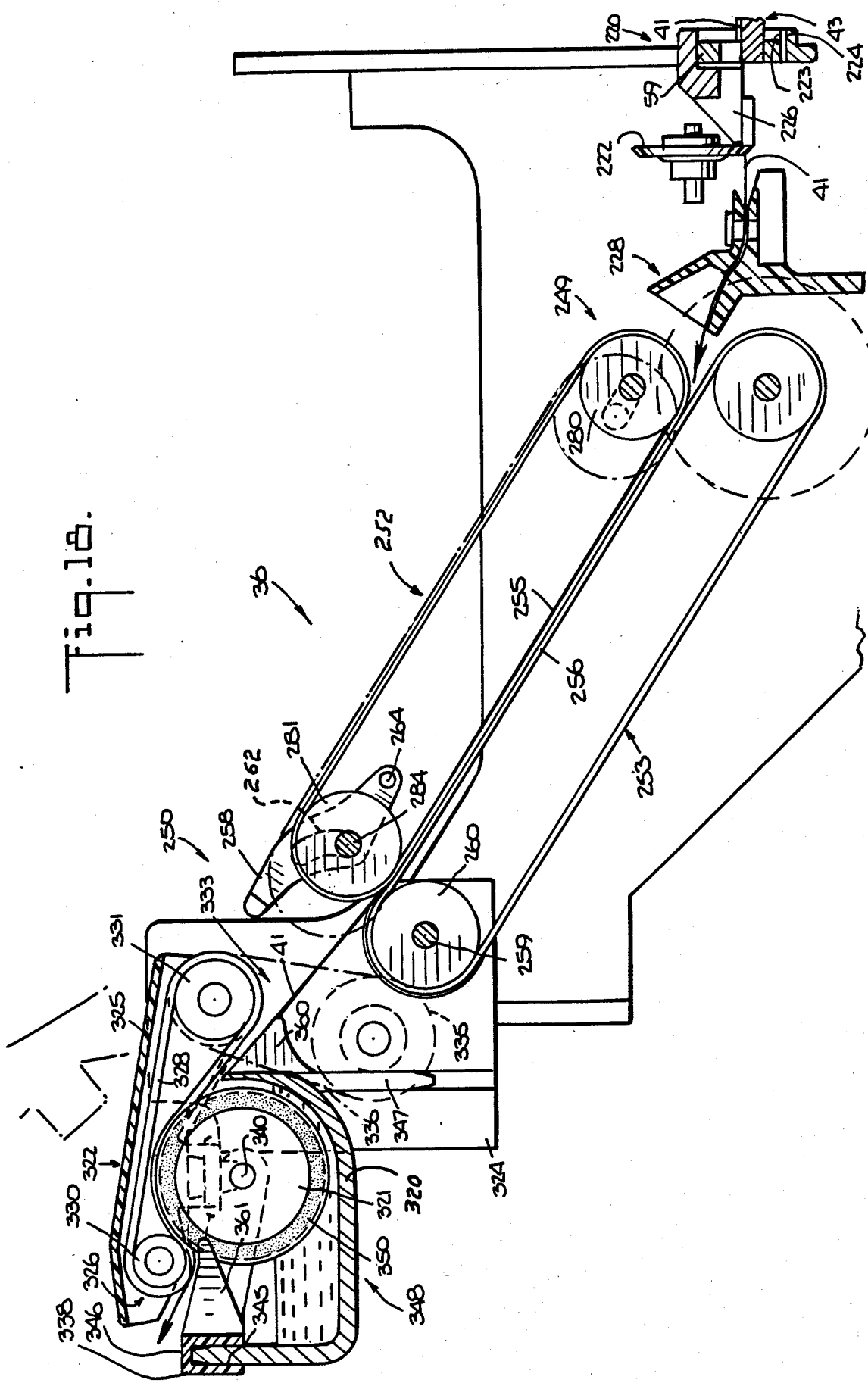
FIG. 18 is a side section view of the tape module takeoff and moistening subsystem with a diverter finger thereof positioned to feed tape to the moistening device, also showing part of the tape track of he tape drive subsystem and the cutting wheel of the tape cutting subsystem of FIG. 1.

Referring to FIG. 18, tape take-away subsystem 36 includes a moistener device 248 through which tape 41 having a water activated glue is passed to activate the glue. A belt conveyer 249 advances tape 41 from tape input guide 228 towards moistener device 248. However, since tape module 25 handles tape 42 which does not include a water-activated glue, when tape 42 is advanced to tape take-away subsystem 36, tape 42 is caused to bypass moistener device 248. Bypassing is accomplished by diverter device 250 depicted in FIGS. 18–21.

Belt conveyer 249 includes upper endless belt conveyer 252 and power endless belt conveyer 253 having endless belts 255, 256, respectively, disposed in a facing relationship to engage and advance tape which is fed between the belts from tape input guide 228. Only one of upper conveyer 252 or lower conveyer 253 need be driven to advance tape between belts 255 and 256. In the embodiment described herein, lower belt 256 is driven. Referring to FIGS. 18 and 19, diverter device 250 includes a finger 258 which is movable between a first position depicted in FIG. 18 for directing tape to moistener device 448 and a second position depicted in FIG. 19 for causing tape to bypass moistener device 248. Upper endless belt conveyer 252 is movable relative to lower endless belt conveyer 253 between the solid and broken-line positions depicted in FIGS. 18 and 19. The position of upper endless conveyer 252 controls automatically the position of finger 258. Finger 258 is pivotally mounted to the shaft 259 of roller 260 of lower conveyer 253 and includes a slot 262 which receives pin 264 of control link 266. Control link 266 is pivotally mounted to the shaft 276 of roller 268 of upper conveyer 252. Longitudinal movement of roller 268 of upper conveyer 252 relative to lower conveyer 253 pivots control link 266 which causes pin 264 to ride in slot 262 of finger 258 and pivot finger 258. Slot 262 is contoured in a generally U-shape to cause finger 258 to pivot between the positions shown in FIGS. 18 and 19 when upper conveyer is moved between the positions depicted in FIGS. 19 and 20.

Referring to FIGS. 20 and 21, mechanism 270 drives upper and lower conveyers 252 and 253 and longitudinally moves upper conveyer 252. A single drive motor 272 advances lower endless belt 256 and longitudinally moves upper conveyer 252. Worm 273 is connected to shaft 274 of motor 272 to rotate therewith. Worm gear 275 is rotatably supported to mesh with worm 273 and to be rotated thereby. An appropriate transmission (not shown) couples shaft 274 of motor 272 to shaft 259 of roller 260 to rotate shaft 259 in the same direction regardless of the direction of rotation of motor shaft 274. Such a transmission may be conventional and will be known to one of skill in the art. A reversal in the direction of rotation of motor shaft 274 is used to longitudinally move upper conveyer 252.

Upper conveyer 252 is supported on rollers 280, 281 which are rotatably carried by respective crank shafts 282, 283. Crank shafts 282, 283 each include axial crank shaft portions 284, 285 connected by a radial crank shaft portion 286. Axial crank shaft portion 285 of crank shafts 282, 283 is journalled so that rotation of crank shafts 282, 283 causes axial crank shaft portion 284 to rotate in a circle having as it radius the length of crank shaft portion 286. Therefore, rotation of axial crank shaft portion 285 by 180 degrees displaces crank shaft portion 284 by twice the length of crank shaft portion 286. That displacement moves rollers 280, 281 and endless belt 255 parallel to lower conveyer 253 by twice the length of crank shaft portion 286.

Crank shafts 282 and 283 are rotated by pulley systems 290, 291 ad spring mechanism 292. Spring mechanism 292 is coupled to the shaft 294 of worm gear 275 and rotates, via pulley system 290, crank shaft 283 by 180 degrees each time the direction of motor 272 is reversed. Spring mechanism 292 includes hubs 296, 297, springs 298, 299, and pins 300, 301. Hubs 296 and 282 are secured on shaft 294 confining pulley 303 free to ride on shaft 294. Springs 298, 299 are identically spirally wound, and have identical inside diameters slightly less than the identical outside diameters of hubs 296, 297. Springs 298, 299 may be made of music wire, for example, having a diameter of 0.020 inches. Springs 298, 299 (FIG. 22) are each terminated at one end by a loop 305, 306, respectively, and at other ends by tangential tangs 307, 308. A rivet 310 passes through pulley 303 and secures springs 298, 299 to pulley 303. When tangs 307, 308 are unimpeded, springs 298, 299 rotationally capture pulley 303 so it is caused to rotate with shaft 294 as if it were keyed thereto. However, when shaft 294 rotates in either direction and one of the tangs is restrained, the associated spring is caused to unwrap and pulley 303 idles with no more frictional torque than presented by the unwound spring in contact with hubs 296, 297. Pans 300 and 301 are provided to engage tangs 307 and 308 and restrain the associated spring from rotating after the respective tang is engaged by the respective pin. By proper selection of the diameters of the shaft 294, the hubs 296, 297, the springs 298, 299 and the pulley 303, the frictional torque may be maintained at a sufficiently low level to allow pulley 303 to so idle.

With worm gear 275 rotating in a counterclockwise direction, tang 308 is engaged by pin 301 and spring 299 causes pulley 303 to idle. Upon reversing the direction of rotation of shaft 294 to clockwise, tang 307 rotates clockwise until it engages pin 300. During rotation of tang 307, spring 298 rotates clockwise and with it pulley 303. Rotation of pulley 303 is transmitted to crank shaft 283 by pulley system 290. Specifically, rotation of pulley 303 rotates, via belt 312, pulley 313 fixed to axial shaft portion 285 of crank shaft 283, thereby rotating crank shaft 283. Crank shaft 282 is rotated in unison with crank shaft 283 by pulley system 291, which includes pulley 315 fixed to crankshaft 283, pulley 316 fixed to crankshaft 282 and belt 317 coupling rotation of pulley 315 to pulley 316. Pulleys 303 and 312 are selected to rotate crank shaft 283 by 180 degrees over the rotation of shaft 294 required for a tang to engage a pin each time the direction of rotation of shaft 294 is reversed.

As discussed above, movement of roller 268 from the solid to the broken line positions shown in FIG. 18, causes finger 258 to pivot from the position depicted in FIG. 18 to the position depicted in FIG. 19. In the FIG. 18 position, finger 258 directs a water activated glue-backed tape 41 towards moistener device 245, and in the FIG. 19 position, finger 258 directs a pressure sensitive adhesive-backed tape 42 away from (below) moistener device 245.

Referring to FIGS. 14 and 18, 19 and 22–25, moistener device 248 supported adjacent belt conveyers 252 and 253 includes water reservoir 320, roller 321 and a tape guide 322. Frame 324 supports reservoir 320 and also pivotally supports a frame 325 to which belt conveyer 326 is mounted. Belt 328 of conveyer 326 is supported by rollers 330, 331 against moistener device roller 321, and driven by roller 331 to rotate clockwise as seen in FIG. 18. Roller 331 of belt conveyer 326 is driven from motor 272 (FIG. 20) by means of an appropriate transmission (not shown) and pulley 335 and belt 336 which cause roller 331 to rotate clockwise regardless of the direction of rotation of motor 272. Such a transmission may be conventional and will be known to one of skill in the art. Tape guide 322 includes an input portion 333 which receives tape from finger 25 (when positioned as depicted in FIG. 18) and direct it between belt 328 and roller 321. Belt 328 is tensioned by its engagement with moistener roller 321 and not only advances tape past roller 321 to moisten the glue on the tape to activate it, but also rotates roller 321 counterclockwise which assists in tape advancement and at the same time moistens roller 321 as it rotates in reservoir 320.

Figure 24:
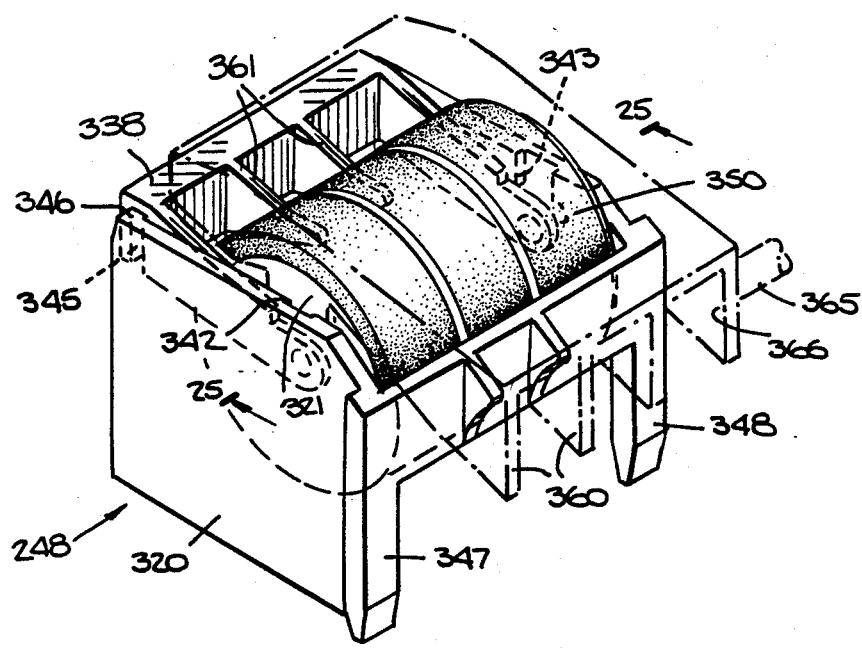
FIG. 24 is a top perspective view of the moistener device.
Figure 25:
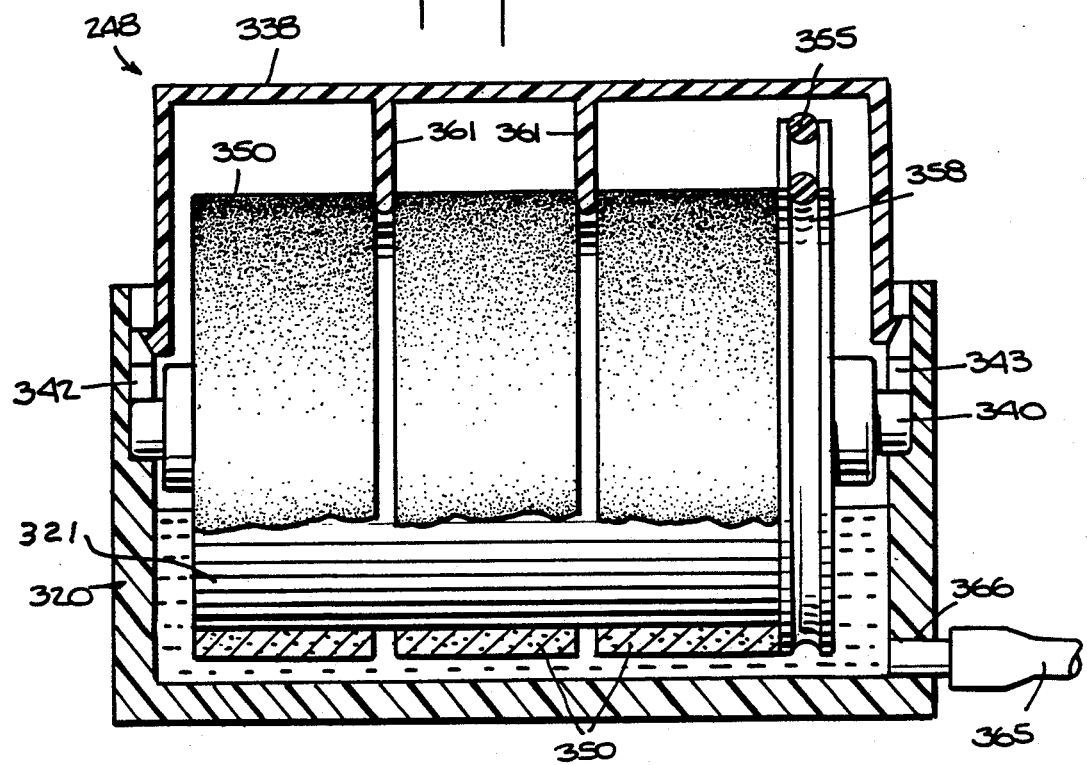
FIG. 25 is a section view of the moistener device of 24 taken along line 25—25 of 24.

Referring to FIG. 227 frame 325 supporting belt conveyer 328 is, as mentioned, pivotally mounted to provide access to reservoir 320, to, for example, facilitate replacement of roller 321, and servicing of the moistener device. Referring to FIGS. 23-25, roller 321 is removably mounted to reservoir 320 by a snap fit arrangement for ease of assembly and disassembly. Roller 321 is rotatably supported in frame 338 on shaft 340. Shaft 340 extends at each end from frame 338 and is received in snap-in fashion in slots 342, 343 of reservoir 320 such that roller 321 resides deeply within reservoir 320 and in contact even with small amounts of water therein. Frame 338 includes a slot 345 sized to receive in snap-in fashion the top, rear edge 346 of reservoir 320 therein. Reservoir 320 includes a pair of spaced prongs 347 and 348 which are received in snap-fit fashion in frame 324 (FIG. 18) to support reservoir 320.

Roller 321 is covered by a layer of absorbent material 350 with which tape advanced past roller 321 is contacted to wet the glue on the tape. A resilient, sorbent material such as felt is preferred as a covering material 350 for roller 321 so that the material is wetted by capillary action when roller 321 is not being rotated. In that way, the material is always wet, even after periods of inactivity when the material 350 is not rotated through the water in reservoir 320. That prevents a build-up of mineral on the surface of the sorbent material which may otherwise happen if the sorbent material is allowed to dry, and also insures that the moistener device is always ready to perform its wetting function. Belt 328 of conveyer 326 is tensioned to force tape 41 against the resilient material 350 to compress it and thereby insure that the entire surface of the tape comes into contact with the material and is wetted without dry spots. Other types of rollers, for example a comb roller, may be used to wet tape 41.

O-ring 355 (FIG. 25) received in groove 358 at the sides of roller 321. Reservoir 220 includes projections 360 attached to the exterior of reservoir 320 to guide tape towards roller 321 and prevent tape from passing below reservoir 320, and projections 361 extending into grooves in roller 321 to guide tape from roller 321 and prevent it from advancing into the reservoir below the roller.

Reservoir 320 is replenished with water via tube 365 (FIG. 25) and corrected to an inlet 366 to reservoir 320.

Initialization and overall operation of tape module 25 is as follows. Tapes 41 and 42 are fed via respective rollers to the respective tape drive rollers in tape advancing means 46. A tape, for example tape 41, is selected for advancement by means of a command entered, for example, by keyboard into an electrical control system controlling, for example, a mailing machine including ape module 25, postage meter 24 and platen module 26 or a larger mailing machine. Another command is entered if the tape is to be wetted. Motor 60 causes first coupling means 53 to couple motor 40 to drive roller 48 and motor 60 is actuated to advance a predetermined length of tape into track 43. The process is repeated for the other tape, in this case tape 42. Another command entered, for example, by a keyboard entry, activates the mailing machine to print indicia on a selected tape. Motor 60 then moves track 43 forward into its printing position, platen 55 is raised to impact the selected tape against the printing device in postage meter 24, the lowered to its rest position, and track 43 is moved back to its home position. Motor 40 is again actuated and motor 272 of tape take-away system is actuated to advance a predetermined length of the imprinted tape into tape take-away subsystem 36. Motor 230 of tape cutting subsystem 229 is then actuated to cause cutting wheel 222 to sever a segment of imprinted tape. The unsevered portion of the tape is then retracted by tape reel supply subsystem 32 in preparation for a next imprinting on the same tape. Motor 272 of tape takeaway subsystem 32 is again activated to advance the severed portion of te tape towards moistener device 248. If a command was previously entered to wet the severed tape, finger 258 is in the raised position of FIG. 18 to guide tape to moistener device 248, and roller 331 is driven by motor 272 to advance tape over wetting roller 321 to the exit of tape module 25. The printing device in postage meter 24 may then be inked, if necessary, prior to the next imprinting of tape. The above cycle is then repeated as long as a command is not entered to imprint the other tape, or not to imprint tape at all.

When a command is entered to imprint a different tape, motor 60 is reversed to retract the tape then being imprinted. Motor 60 is then reversed to cause motor 40 to be coupled to the drive roller for the other tape and activated long enough to return carriage 44 back to its home position. Motor 40 is the reversed again to advance a predetermine length of the new tape into track 43. If the new tape is not to be wetted, another command is entered which moves conveyer 252 closer to moistener device 248 causing finger 258 to pivot downwardly to the position depicted in FIG. 19. Tape imprinting, cutting and withdrawal towards the exit of tape module 25 proceed as described above, except that the tape is not fed to moistener device 248.

The control system described in application Ser. No. 291,483 referenced above, may be used to accomplish and synchronize the foregoing.

Certain changes and modifications of the embodiments of the invention herein disclosed will be readily apparent to those of skill in the art. Moreover, uses of the invention other than in mailing apparatus will also be readily apparent to those of skill in the art. It is the applicants' intention to cover by the claims all such uses and all those changes and modifications which could be made to the embodiments of the invention herein chosen for the purposes of disclosure which do not depart from the spirit and scope of the invention.

I claim:

1. A device for converting a force applied thereto that varies with distance to a constant force, and vice versa, comprising:

a first gear section including gear teeth extending about an arc of a first circle having a first center;

a second gear section including gear teeth extending about an arc of a second circle having a second center;

means supporting said first and second gear sections in a meshing relationship with at least one of said gear sections supported to pivot about an axis which is eccentric with respect to said center of said circle about said arc of which the gear teeth of said at least one gear section extend, such that said two gear sections pivot eccentrically with respect to each other and a torque varying with angle or a force varying with distance applied to one gear section provides a torque constant with angle or a force constant with distance at said other gear section, and vice versa.

2. A device for converting a force applied thereto from a torsion-type spring that varies with distance to a constant force, comprising:

a first gear section including gear teeth extending about an arc of a first circle having a first center;

a second gear section including gear teeth extending about an arc of a second circle having a second center;

means supporting said first and second gear sections in a meshing relationship with at least one of said gear sections supported to pivot about an axis which is eccentric with respect to said center of said circle about said arc of which the gear teeth of said at least one gear section extend, such that said two gear sections pivot eccentrically with respect to each other and a torque varying with angle applied to one gear section by said spring, provides a torque constant with angle at said other gear section; and means coupling one end of said spring to said one of said gear sections.

* * * * *